(12) United States Patent
Li et al.

(10) Patent No.: US 11,425,609 B2
(45) Date of Patent: Aug. 23, 2022

(54) SIDELINK RESERVATION ACROSS FREQUENCY BANDS

(71) Applicant: QUALCOMM Incorporated, San Diego, CA (US)

(72) Inventors: Junyi Li, Chester, NJ (US); Jose Edson Vargas, San Diego, CA (US); Kapil Gulati, Hillsborough, NJ (US); Zhibin Wu, Los Altos, CA (US)

(73) Assignee: QUALCOMM Incorporated, San Diego, CA (US)

(*) Notice: Subject to any disclaimer, the term of this patent is extended or adjusted under 35 U.S.C. 154(b) by 51 days.

(21) Appl. No.: 16/896,881

(22) Filed: Jun. 9, 2020

(65) Prior Publication Data
US 2020/0413295 A1 Dec. 31, 2020

Related U.S. Application Data

(60) Provisional application No. 62/867,787, filed on Jun. 27, 2019.

(51) Int. Cl.
*H04W 28/26* (2009.01)
*H04W 72/04* (2009.01)
(Continued)

(52) U.S. Cl.
CPC .............. *H04W 28/26* (2013.01); *H04W 4/40* (2018.02); *H04W 16/14* (2013.01);
(Continued)

(58) Field of Classification Search
CPC .............. G01S 7/021; H04L 27/0006; H04W 4/40–48; H04W 8/20; H04W 16/14–16;
(Continued)

(56) References Cited

U.S. PATENT DOCUMENTS

2018/0234888 A1  8/2018  Yasukawa et al.
2020/0323019 A1  10/2020  Vargas et al.
2020/0374858 A1  11/2020  Vargas et al.

FOREIGN PATENT DOCUMENTS

EP    3592075 A1    1/2020
WO    2018174611 A1  9/2018

OTHER PUBLICATIONS

Interdigital, et al., "NR Sidelink Resource Allocation Mechanism for Mode 2", 3GPP Draft, 3GPP TSG RAN WG1 #97, R1-1907094, 3rd Generation Partnership Project (3GPP), Mobile Competence Centre, 650, Route Des Lucioles, F-06921 Sophia-Antipo vol. RAN WG1, Reno, USA, May 13, 2019-May 17, 2019, May 13, 2019, XP051728540, 6 Pages, Retrieved from the Internet: URL: http://www.3gpp.org/ftp/Meetings%5F3GPP%5FSYNC/RAN1/Docs/R1%2D1907094%2Ezip, [retrieved on May 13, 2019], Reservation based scheme, p. 3, paragraph 2.3.1—p. 4.

(Continued)

*Primary Examiner* — Thomas R Cairns
(74) *Attorney, Agent, or Firm* — Loza & Loza, LLP/QUALCOMM Incorporated

(57) ABSTRACT

Aspects relate to mechanisms for sidelink reservation across frequency bands. In some examples, a sidelink device may be configured to communicate over a first frequency band (e.g., a sub-6 gigahertz frequency band) and a second frequency band (e.g., a millimeter wave frequency band) with one or more other sidelink devices. The sidelink device may further be configured to perform cross-link resource reservation for a sidelink transmission in which a resource reservation message transmitted on the first frequency band indicates reserved resources within the second frequency band for the sidelink transmission. The sidelink device may then transmit sidelink control information (SCI) within a sidelink control channel on the second frequency band and (Continued)

user data traffic corresponding to the SCI within a sidelink data channel on the second frequency band.

66 Claims, 13 Drawing Sheets

(51) Int. Cl.
*H04W 76/27* (2018.01)
*H04W 4/40* (2018.01)
*H04W 16/14* (2009.01)
*H04W 92/18* (2009.01)

(52) U.S. Cl.
CPC ... *H04W 72/0453* (2013.01); *H04W 72/0493* (2013.01); *H04W 76/27* (2018.02); *H04W 92/18* (2013.01)

(58) Field of Classification Search
CPC . H04W 28/26; H04W 36/0072; H04W 72/04; H04W 72/0406; H04W 72/0413–0433; H04W 72/0453; H04W 72/0493; H04W 72/12; H04W 76/10; H04W 76/14; H04W 76/27; H04W 84/18; H04W 92/18
See application file for complete search history.

(56) References Cited

OTHER PUBLICATIONS

International Search Report and Written Opinion—PCT/US2020/036989—ISAEPO—dated Sep. 16, 2020.
Mediatek Inc: "On Sidelink Mode-2 Resource Allocation", 3GPP Draft, 3GPP TSG RAN WG1 #97, R1-1906555, 3rd Generation Partnership Project (3GPP), Mobile Competence Centre, 650, Route Des Lucioles, F-06921 Sophia-Antipolis Cedex, France, vol. RAN WG1, Reno, USA, May 13, 2019-May 17, 2019, May 13, 2019, XP051728006, 8 Pages, Retrieved from the Internet: URL: http://www.3gpp.org/ftp/Meetings%5F3GPP%5FSYNC/RAN1/Docs/R1%2D1906555%2Ezip, [retrieved on May 13, 2019], Resource Reservation, p. 4, paragraph 2.1.3—p. 5.

SIDELINK RESERVATION ACROSS FREQUENCY BANDS

PRIORITY CLAIM

This application claims priority to and the benefit of Provisional Patent Application No. 62/867,787, entitled "Sidelink Reservation Across Frequency Bands," filed in the U.S. Patent and Trademark Office on Jun. 27, 2019, the entire contents of which are incorporated herein by reference as if fully set forth below in their entirety and for all applicable purposes.

INTRODUCTION

The technology discussed below relates generally to wireless communication networks, and more particularly, to sidelink wireless communication.

In many existing wireless communication systems, a cellular network is implemented by enabling wireless user equipment to communicate with one another through signaling with a nearby base station or cell. As a user equipment moves across the service area, handovers take place such that each user equipment maintains communication with one another via its respective cell.

Another scheme for a wireless communication system is a device-to-device (D2D) network, in which wireless user equipment may signal one another directly, rather than via an intermediary base station or cell. For example, D2D communication networks may utilize sidelink signaling to facilitate the direct communication between user equipment. In some sidelink network configurations, user equipment may further communicate in a cellular network, generally under the control of a base station. Thus, the user equipment may be configured for uplink and downlink signaling via a base station and further for sidelink signaling directly between the user equipment without transmissions passing through the base station.

In wireless communication systems, such as those specified under standards for 5G New Radio (NR), both the base station and wireless communication devices may utilize beamforming to compensate for high path loss and short range. Beamforming is a signal processing technique used with an antenna array for directional signal transmission and/or reception. For example, an antenna in the antenna array can transmit a signal that is combined with other signals of other antennas of the same array in such a way that signals at particular angles experience constructive interference while others experience destructive interference. Beamforming may be implemented in both traditional cellular network configurations and sidelink network configurations on higher frequency bands to support increased data rates.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for wireless communication at a first sidelink device is disclosed. The method includes transmitting a resource reservation message on a first frequency band including a first carrier frequency. The resource reservation message includes an indication of reserved resources on a second frequency band including a second carrier frequency for transmission of user data traffic from the first sidelink device to a second sidelink device. The method further includes transmitting a sidelink control channel on the second frequency band within the reserved resources. The sidelink control channel includes sidelink control information (SCI) associated with the user data traffic to be transmitted from the first sidelink device to the second sidelink device. The method further includes transmitting a sidelink data channel including the user data traffic on the second frequency band within the reserved resources.

Another example provides a first sidelink device including a processor, a wireless transceiver communicatively coupled to the processor, and a memory communicatively coupled to the processor. The processor and the memory are configured to transmit a resource reservation message on a first frequency band including a first carrier frequency via the wireless transceiver. The resource reservation message includes an indication of reserved resources on a second frequency band including a second carrier frequency for transmission of user data traffic from the first sidelink device to a second sidelink device. The processor and the memory are further configured to transmit a sidelink control channel on the second frequency band within the reserved resources. The sidelink control channel includes sidelink control information (SCI) associated with the user data traffic to be transmitted from the first sidelink device to the second sidelink device. The processor and the memory are further configured to transmit a sidelink data channel including the user data traffic on the second frequency band within the reserved resources.

Another example provides a method for wireless communication at a first sidelink device. The method includes receiving a resource reservation message on a first frequency band including a first carrier frequency. The resource reservation message includes an indication of reserved resources on a second frequency band including a second carrier frequency for transmission of user data traffic from a second sidelink device. The method further includes receiving a sidelink control channel on the second frequency band. The sidelink control channel includes sidelink control information (SCI) associated with the user data traffic to be transmitted from the second sidelink device to the first sidelink device. The method further includes receiving a sidelink data channel including the user data traffic on the second frequency band.

Another example provides a method for wireless communication at a first sidelink device. The method includes receiving a resource reservation message on a first frequency band including a first carrier frequency. The resource reservation message includes an indication of reserved resources on a second frequency band including a second carrier frequency for transmission of user data traffic from a second sidelink device to a third sidelink device. The method further includes managing interference on the reserved resources based on the resource reservation message.

These and other aspects of the disclosure will become more fully understood upon a review of the detailed description, which follows. Other aspects, features, and examples of the present disclosure will become apparent to those of ordinary skill in the art, upon reviewing the following description of specific, exemplary examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while examples may be discussed below as device, system, or method examples it should be understood that such examples can be implemented in various devices, systems, and methods.

DETAILED DESCRIPTION

Figure 1:
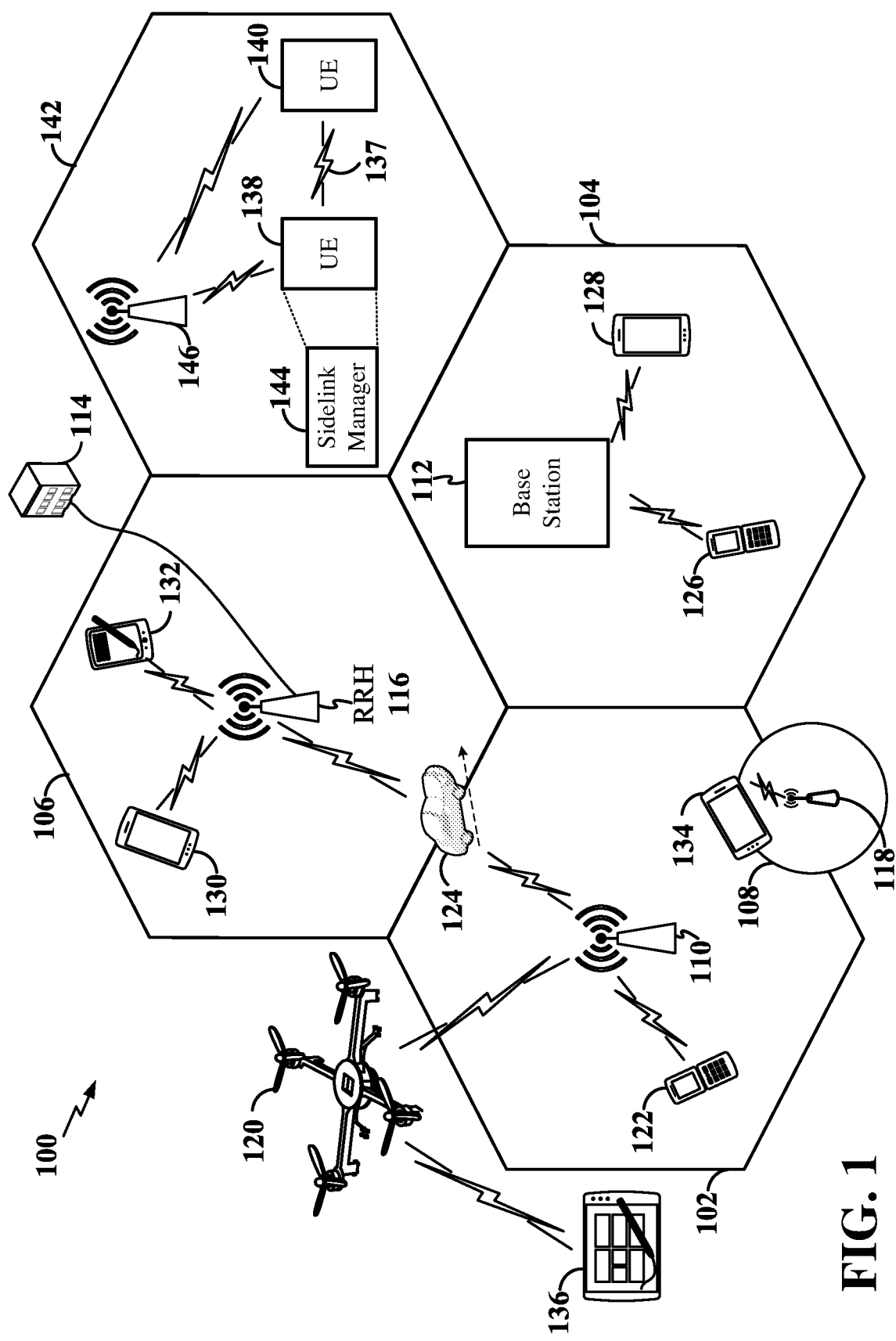
FIG. 1 is a diagram illustrating an example of a wireless radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Various aspects of the disclosure relate to mechanisms for sidelink reservation across frequency bands. In some examples, a sidelink device may be configured to communicate over a first frequency band (e.g., a sub-6 gigahertz frequency band) utilizing an omni-directional beam and a second frequency band (e.g., a millimeter wave frequency band) utilizing respective directional beams with one or more other sidelink devices. The sidelink device may further be configured to perform cross-link resource reservation for a sidelink transmission in which a resource reservation message transmitted on the first frequency band indicates reserved resources within the second frequency band for the sidelink transmission. The sidelink device may then transmit sidelink control information (SCI) within a sidelink control channel (e.g., a physical sidelink control channel (PSCCH)) on the second frequency band and user data traffic corresponding to the SCI within a sidelink data channel (e.g., a physical sidelink shared channel (PSSCH)) on the second frequency band. The SCI may include scheduling information indicating scheduled resources within the reserved resources for the transmission of the user data traffic.

In some examples, the resource reservation message may be a groupcast message transmitted to a target sidelink device for the sidelink transmission and other neighboring sidelink devices. In other examples, the resource reservation message may include both a unicast message transmitted to the target sidelink device and a groupcast message transmitted to other neighboring sidelink devices. The neighboring sidelink devices may utilize the resource reservation message to manage interference on the reserved resources.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, examples and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, 142 and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, three base stations 110, 112, and 146 are shown in cells 102, 104, and 142, respectively; and a third base station 114 is shown controlling a remote radio head (RRH) 116 in cell 106. That is, a base station can have an integrated antenna or can be connected to an antenna or RRH by feeder cables. In the illustrated example, the cells 102, 104, 106, and 142 may be referred to as macrocells, as the base stations 110, 112, 114, and 146 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118, 146 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; UEs 138 and 140 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, 146, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, 132, 138, and 140 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, two or more UEs (e.g., UEs 138 and 140) may communicate with each other using sidelink signals 137 without relaying that communication through a base station (e.g., base station 146) and without necessarily relying on scheduling or control information from a base station. In some examples, the UE 138 is functioning as a scheduling entity or an initiating (e.g., transmitting) sidelink device, and UE 140 may function as a scheduled entity or a receiving sidelink device. For example, the UE 138 may function as a scheduling entity in a device-to-device (D2D), peer-to-peer (P2P), vehicle-to-vehicle (V2V) network, a vehicle-to-everything (V2X) network, and/or in a mesh network.

V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard.

To facilitate V2X communication over a sidelink 137, a UE (e.g., UE 138) may include a sidelink manager 144 configured to establish a respective sidelink with one or more other UEs (e.g., UE 140). The sidelink manager 144 may further be configured to reserve resources for sidelink communication with another UE (e.g., UE 140) across frequency bands. In some examples, the sidelink manager 144 may be configured to communicate over a first frequency band (e.g., a sub-6 gigahertz frequency band) utilizing an omni-directional beam and a second frequency band (e.g., a millimeter wave frequency band) utilizing respective directional beams with one or more other sidelink devices (e.g., UE 140). The sidelink manager 144 may further be configured to generate and transmit a resource reservation message on the first frequency band indicating reserved resources within the second frequency band for a sidelink transmission (e.g., a sidelink transmission towards UE 140). The sidelink manager 144 may then be configured to transmit SCI within a PSCCH on the second frequency band and user data traffic corresponding to the SCI within a PSSCH on the second frequency band.

Figure 2:
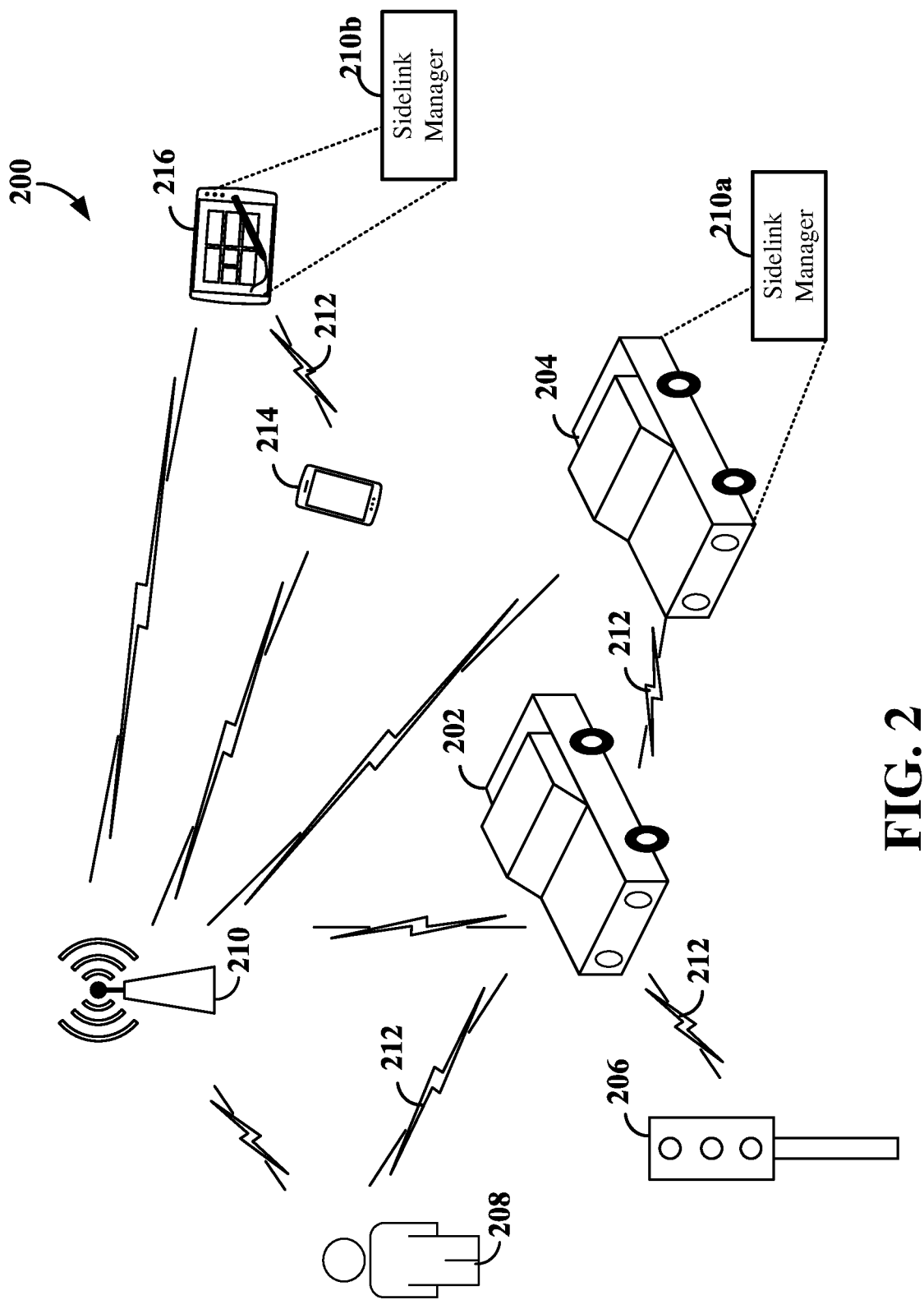
FIG. 2 is a diagram illustrating an example of a vehicle-to-everything (V2X) wireless communication network.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure 206, such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 15, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicles 202 and 204 or between a vehicle 202 or 204 and either infrastructure 206 or a pedestrian 208 occurs over a proximity service (ProSe) PC5 interface 212. In various aspects of the disclosure, the PC5 interface 212 may further be utilized to support D2D communication in other proximity use cases. Examples of other proximity use cases may include public safety or commercial (e.g., entertainment, education, office, medical, and/or interactive) based proximity services. In the example shown in FIG. 2, ProSe communication may occur between UEs 214 and 216.

ProSe communication may support different operational scenarios, such as in-coverage, out-of-coverage, and partial coverage. Out-of-coverage refers to a scenario in which UEs 214 and 216 are outside of the coverage area of a base station (e.g., base station 210), but each are still configured for ProSe communication. Partial coverage refers to a scenario in which one of the UEs (e.g., UE 216) is outside of the coverage area of a base station (e.g., base station 210), while the other UE (e.g., UE 214) is in communication with the base station 210. In-coverage refers to a scenario in which UEs 214 and 216 are in communication with the base station 210 (e.g., gNB) via a Uu (e.g., cellular interface) connection to receive ProSe service authorization and provisioning information to support ProSe operations.

Communication between the various V2X and D2D devices (which may collectively be referred to herein as sidelink devices or UEs) may be facilitated using sidelinks in one or more frequency bands. In some examples, a V2X device (e.g., vehicle 204) may include a sidelink manager 210a configured to establish respective sidelinks with other nearby V2X devices (e.g., roadway infrastructure 206, pedestrians/cyclists 208, and other vehicles 202) and to manage communication on the respective sidelinks. In addition, a D2D device (e.g., UE 216) may include a sidelink manager 210b configured to establish respective sidelinks with other nearby D2D devices (e.g., UE 214) and to manage communication on the respective sidelinks. The sidelink managers 210a and 210b may correspond, for example, to the sidelink manager 144 shown in FIG. 1.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
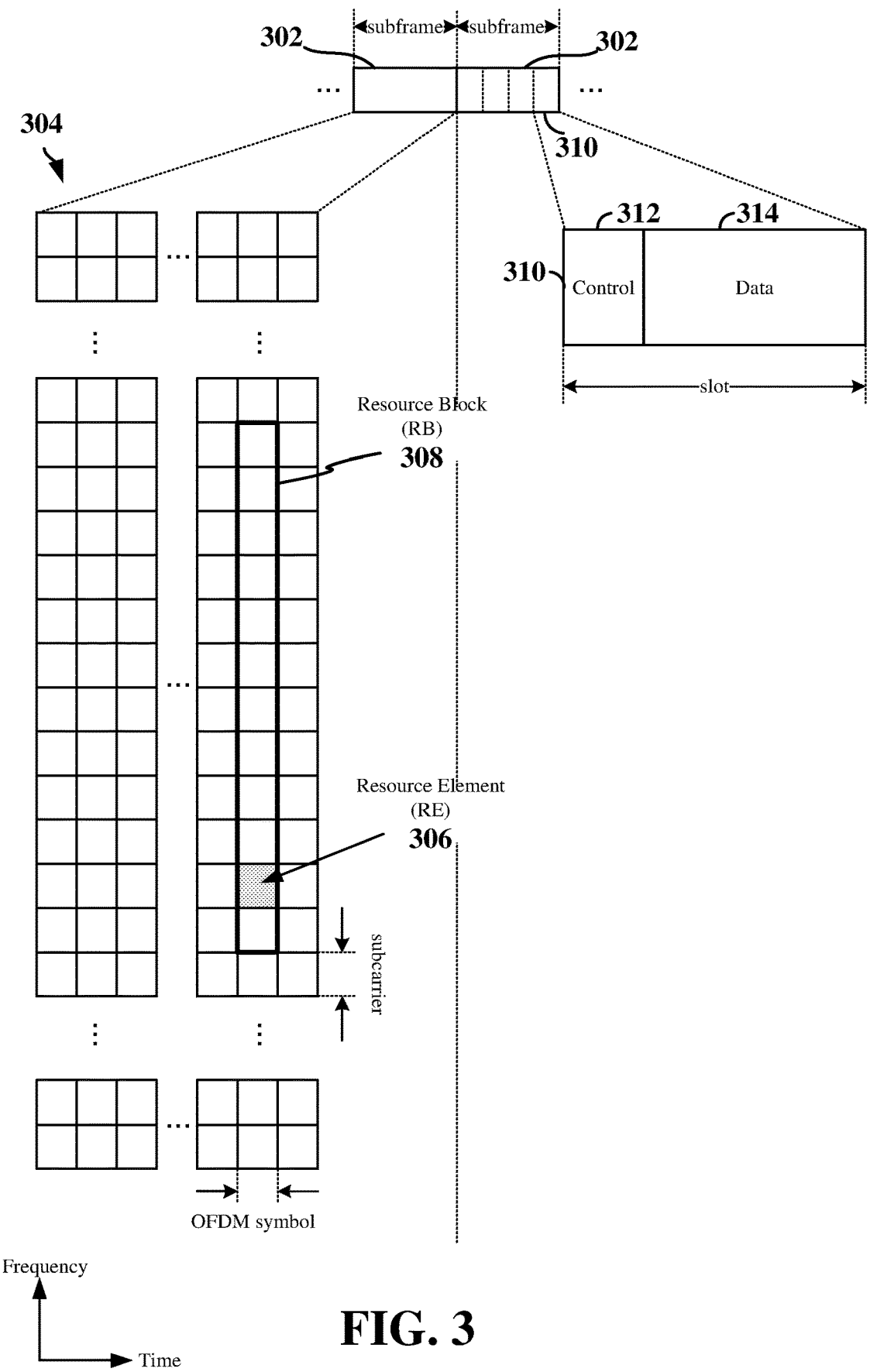
FIG. 3 is a schematic diagram illustrating organization of wireless resources in an air interface utilizing orthogonal frequency divisional multiplexing (OFDM).

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signal. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, in V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example of sidelink communication, the control region 312 of the slot 310 may include a physical sidelink control channel (PSCCH) including sidelink control information (SCI) transmitted by a UE (e.g., sidelink device, such as a V2X or other D2D device) towards a set of one or more other UEs (e.g., other sidelink devices). In some examples, the SCI may include synchronization information to synchronize communication between sidelink devices on the sidelink channel. In addition, the SCI may include scheduling information indicating one or more resource blocks within the data region 314 reserved by an initiating (or transmitting) sidelink device (e.g., the "scheduling entity") for sidelink communication. The data region 314 of the slot 310 may include a physical sidelink shared channel (PSSCH) including the data transmitted by the initiating sidelink device within the reserved resources over the sidelink channel.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some aspects of the disclosure, sidelink devices (e.g., V2X or D2D devices) may be configured for beamforming and/or multiple-input multiple-output (MIMO) technology. For example, in millimeter wave (mmWave) sidelink systems, beamformed signals may be utilized for most channels, including the physical sidelink control channel (PSCCH) and physical sidelink shared channel (PSSCH).

Figure 4:
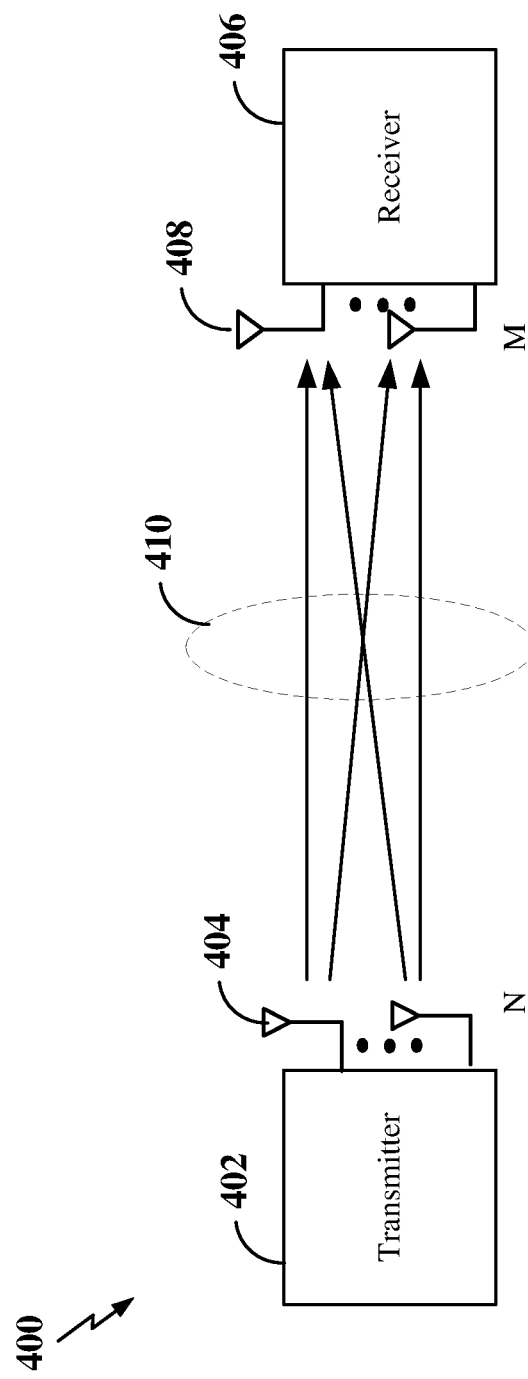
FIG. 4 is a block diagram illustrating a wireless communication system supporting beamforming and multiple-input multiple-output (MIMO) communication.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a sidelink device or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

V2X communication systems may utilize both millimeter wave (mmWave) frequency bands and sub-6 GHz frequency bands. As illustrated in FIG. 4, mmWave beamforming may be utilized to communicate over directional beams. For sub-6 GHz frequency band communication, omni-directional or other like beams may be used.

Figure 5:
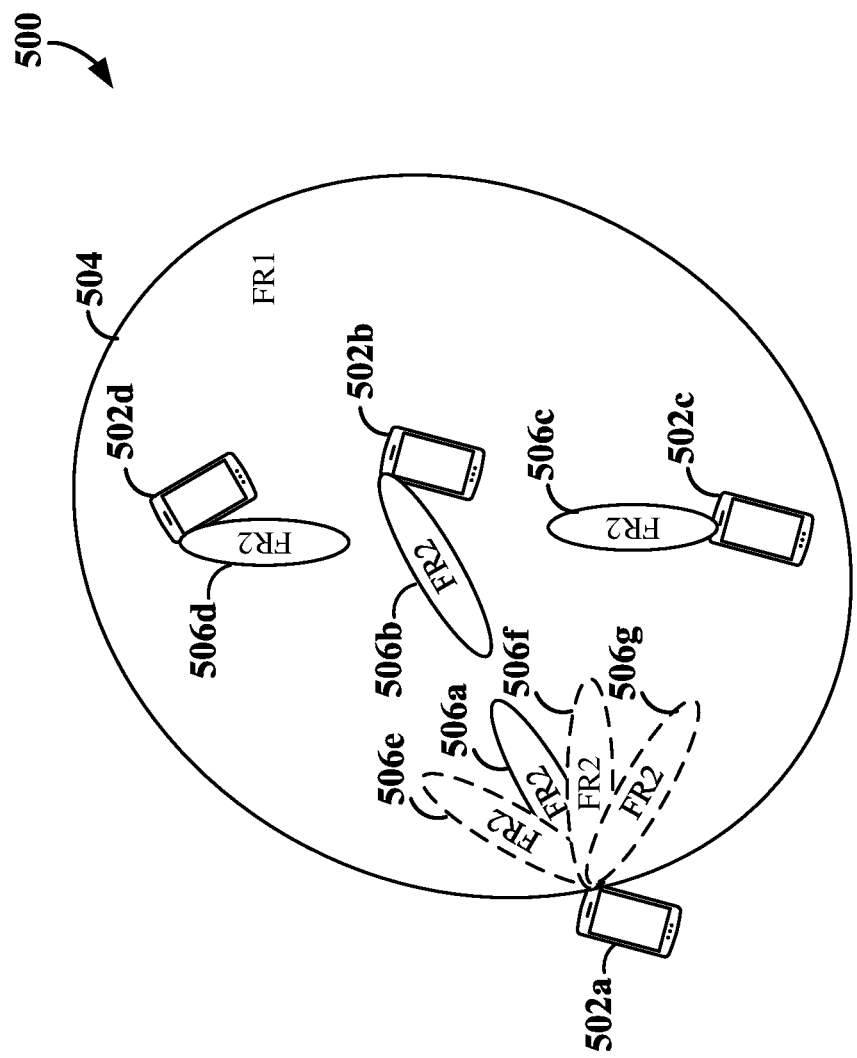
FIG. 5 is a diagram illustrating an example of sidelink communication across two different frequency bands in a wireless network.

FIG. 5 is a diagram illustrating an example of sidelink communication across two different frequency bands in a wireless network. The wireless network 500 includes a plurality of sidelink devices 502a-502d, each of which may correspond, for example, to one of the V2X or D2D devices shown in FIG. 2.

In the example shown in FIG. 5, the sidelink device 502a may be configured to simultaneously operate in at least two frequency bands, such as, for example, one or more sub-6 GHz frequency bands and one or more mmWave frequency bands. As used herein, the term "simultaneously" may refer to the capability of the sidelink device to communicate over both a first frequency band (e.g., an FR1 or sub-6 GHz frequency band) and a second frequency band (e.g., an FR2 or mmWave frequency band) during overlapping time periods, though the sidelink device may not be transmitting and/or receiving data on both frequency bands at the same time.

In example sub-6 GHz communications, the sidelink device 502a may be configured to transmit an omni-directional beam 504 over FR1. The omni-directional beam 504 may be received by a plurality of other sidelink devices 502b, 502c, and 502d. In example mmWave communications, the sidelink device 502a may be configured to transmit a directional beam 506a over FR2. Due to the directional nature of beam 506a, the directional transmit beam 506a may be received by a subset of the plurality of sidelink devices. For example, the directional transmit beam 506a may be received by a single receiving sidelink device (e.g., sidelink device 502b). In this example, the receiving sidelink device 502b may utilize a directional receive beam 506b to receive communications from the transmitting sidelink device 502a. The transmit beam 506a and receive beam 506b collectively form a beam pair link (BPL) for the signal path over FR2 between the sidelink devices 502a and 502b. Due to reciprocity, each beam within the BPL may be utilized for both transmission and reception.

In some examples, a unicast connection between the sidelink device 502a and another sidelink device (e.g., the sidelink device 502b) may be established over an FR1 sidelink and/or an FR2 sidelink. To establish a unicast connection over an FR1 sidelink (e.g., a sub-6 GHz sidelink), the sidelink device 502a may utilize, for example, a D2D (e.g., V2V, V2X, etc.) peer-to-peer discovery procedure to identify and locate candidate sidelink devices for unicast communications. For example, the sidelink device 502a may locate candidate sidelink devices based on basic service messages (BSMs) broadcasted by neighboring sidelink devices (e.g., sidelink devices 502b, 502c, and 502d). The BSM may include location information (e.g., Global Positioning System (GPS) coordinates) of the broadcasting sidelink device, security and identity information, and vehicle information (e.g., speed, trajectory, route, etc.) of the broadcasting sidelink device. Upon locating another sidelink device (e.g., the sidelink device 502b), the sidelink devices 502a and 502b may establish a radio resource control (RRC) connection and a signaling radio bearer (SRB) on an FR1 sidelink via, for example, a D2D RRC interface (e.g., an RRC procedure over the ProSe Sidelink (PC5) interface).

The sidelink devices 502a and 502b may then set a packet data convergence protocol (PDCP) context, a radio link control (RLC) context, a medium access control (MAC) context, and a physical layer (PHY) context for the FR1 unicast connection. For example, the PDCP context may indicate whether PDCP duplication is utilized for the unicast connection. The RLC context may indicate whether an acknowledged mode (e.g., a reordering timer is used) or an unacknowledged mode is used for the RLC layer. The MAC context may enable, for example, a hybrid automatic repeat request (HARQ) feedback scheme, resource selection algorithms, carrier aggregation, or other MAC parameters for the unicast connection. The PHY context may indicate a transmission format and a radio resource configuration (e.g., bandwidth part (BWP), numerology, etc.) for the unicast connection.

A unicast connection between the sidelink device 502a and another sidelink device (e.g., the sidelink device 502b) over an FR2 sidelink (e.g., a mmWave sidelink) may be established in a standalone (SA) mode or in a non-standalone (NSA) mode. In the SA mode, the mmWave sidelink may be established without the support of any other previously established communication link in a different frequency band or radio access technology (RAT).

In the NSA mode, the mmWave sidelink is established with the support of a previously established unicast link (e.g., the sub-6 GHz sidelink). For example, the sidelink device 502a may transmit an RRC reconfiguration message (e.g., an RRCDirectConnectionReconfiguraton message) to the sidelink device 502b over the SRB previously established via the FR1 sidelink. The RRC reconfiguration message may include, for example, mmWave physical layer (PHY) configurations for beam direction(s), timing, location, and/or other Layer 1 (L1)/Layer 2 (L2) parameters in the radio protocol stack (e.g., the Open System Interconnection (OSI) model). The sidelink devices 502a and 502b may then perform PHY and MAC Layer procedures in FR2 to determine the serving BPL (e.g., beams 506a and 506b) and perform synchronization.

Upon establishing the mmWave (FR2) sidelink, the sidelink device 502a (e.g., the source sidelink device 502a) may transmit data over the FR2 sidelink to the sidelink device 502b (e.g., the target sidelink device). In some examples, the source sidelink device 502a may transmit a PSCCH over the FR2 sidelink to the target sidelink device 502b utilizing the selected BPL (e.g., beams 506a and 506b). The PSCCH may include SCI containing scheduling information indicating the resources (e.g., one or more resource blocks) reserved by the source sidelink device 502a to transmit a PSSCH containing data. The source sidelink device 502a may then transmit the PSSCH including the data within the reserved resources over the FR2 sidelink to the target sidelink device 502b utilizing the transmit and receive beams 506a and 506b.

Neighboring sidelink devices (e.g., sidelink devices 502c and 502d) may need to have knowledge of the resources reserved for the PSSCH transmission to avoid collisions. However, due to the directional nature of transmit beam 506a, other neighboring sidelink devices may not receive the PSCCH, and as a result, may not be aware of the reservation of PSSCH resources by the source sidelink device 502a. For example, neighboring sidelink devices 502c and 502d may be communicating over another FR2 sidelink utilizing a respective BPL (e.g., transmit and receive beams 506c and 506d). If the neighboring sidelink device 502c did not receive the PSCCH from the source sidelink device 502a, the neighboring sidelink device 502c may select the same resources for another PSSCH transmitted from neighboring sidelink device 502c to neighboring sidelink device 502d, thus creating interference between the two PSSCH transmissions. Therefore, to avoid such interference, the source sidelink device 502a may perform a beam sweep of the PSCCH in FR2 (e.g., transmit the PSCCH on each of beams 506e-506g) to inform other neighboring sidelink devices (e.g., sidelink device 502c) of the resources reserved by the source sidelink device 502a for upcoming PSSCH transmissions. However, broadcasting the reserved unicast resources in multiple beams may lead to undesirable overhead.

Therefore, in various aspects of the disclosure, the source sidelink device 502a may be configured to perform cross-link resource reservation to reserve resources in advance for the FR2 sidelink via the FR1 sidelink. For example, the source sidelink device 502a may be configured to transmit a resource reservation message over FR1 (e.g., over the sub-6 GHz frequency band) to reserve resources for a future sidelink transmission to the target sidelink device 502b on the FR2 sidelink. The source sidelink device 502a may then be configured to transmit the PSCCH and the PSSCH on the FR2 sidelink (e.g., over the mmWave frequency band) within the reserved resources. In some examples, the PSCCH may include SCI containing scheduling information indicating the scheduled resources within the reserved resources over which the source sidelink device 502a will transmit the PSSCH containing data.

Based on the resource reservation message, the target sidelink device 502b may beamform towards the source sidelink device 502a utilizing the receive beam 506b to receive the PSCCH and PSSCH within the reserved resources over the FR2 sidelink. In addition, neighboring sidelink devices may receive the resource reservation message transmitted over FR1, and as such, the source sidelink device 502a may avoid broadcasting the scheduled FR2 unicast resources via beam sweeping to multiple neighboring sidelink devices within a communication range of the source sidelink device 502a. In some examples, the resource reservation message may include a groupcast message that is transmitted to each of the neighboring sidelink devices over respective FR1 sidelinks. The resource reservation message may further be unicast over the FR1 sidelink to the target sidelink device 502b. In some examples, the cross-link resource reservation mechanism described herein may be utilized in the opposite manner to reserve resources on the FR1 carrier using the FR2 carrier.

Figure 6:
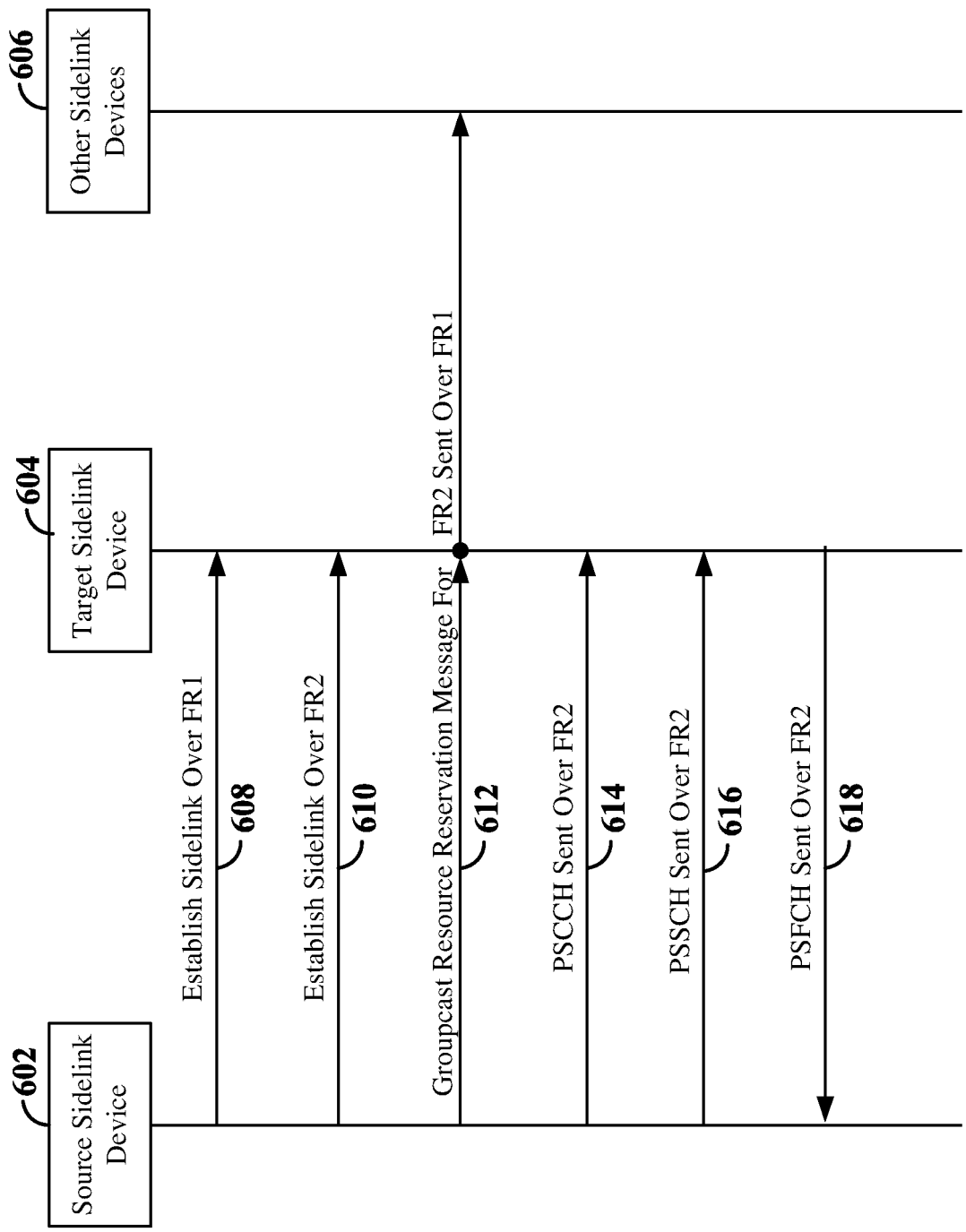
FIG. 6 is a signaling diagram illustrating an exemplary flow for performing cross-link resource reservation for a sidelink transmission.

FIG. 6 is a signaling diagram illustrating an exemplary flow for performing cross-link resource reservation for a sidelink transmission between sidelink devices 602 and 604 in, for example, a V2X NSA deployment including the sidelink devices 602 and 604 and other neighboring sidelink devices 606. The sidelink devices 602, 604, and 606 may correspond, for example, to sidelink devices shown in FIG. 5 and/or V2X devices shown in FIG. 2. In the example shown in FIG. 6, sidelink device 602 may be referred to as the source sidelink device, while sidelink device 604 may be referred to as the target sidelink device.

At 608, the source and target sidelink devices 602 and 604 may initially establish a sidelink over a first frequency band FR1 (e.g., a sub-6 GHz frequency band), as described above in connection with FIG. 5. For example, after discovery (e.g., using a V2V peer discovery procedure), the source sidelink device 602 may establish a radio resource control (RRC) connection and a signaling radio bearer (SRB) for the FR1 sidelink A SRB is a logical communication channel on L2 and higher layers for the transfer of control information for a communication session. For example, the SRB may carry a dedicated control channel (DCCH) including PHY layer, MAC layer, and other access layer control information to initiate the communication session. Using the SRB, the configuration of the L2 and higher protocol layers is of a semi-static nature that occurs during set-up of the communication session. PHY layer control is more dynamic in nature based on resource allocation (e.g., time, frequency, space, and/or power), and thus, PHY layer control and adaption typically occur at the time that data is being exchanged (e.g., transmitted/received).

The SRB may further establish one or more data radio bearers (DRBs) for the communication session. A data radio bearer is a logical communication on L2 and higher layers for the transfer of data for the communication session. For example, a DRB carries dedicated traffic channel (DTCH) data for a communication session. A DRB may be established using a radio bearer (RB) setup procedure on the SRB.

At 610, the source and target sidelink devices 602 and 604 may further establish a sidelink over a second frequency band FR2 (e.g., a mmWave frequency band) using a NSA deployment, as described above in connection with FIG. 5. For example, the FR2 sidelink may be established with the support of the previously established sidelink on FR1. In particular, the SRB established on FR1 may be utilized to establish a DRB on FR2. In an example, the source sidelink device 602 may determine that a data flow for the target sidelink device 604 should be transmitted over FR2. In some examples, the source sidelink device 602 may determine that FR2 should be utilized for the data flow based on a QoS of the data flow (e.g., data rate, throughput, latency, etc.), configuration information (e.g., provided by a network entity, such as a base station, or an application server), negotiation with the target sidelink device 604 and/or a particular QoS-to-sidelink radio bearer (SLRB) mapping.

The source sidelink device 602 may then transmit an RRC reconfiguration message over the previously established SRB on FR1 to initiate establishment of the FR2 sidelink. For example, the RRC reconfiguration message sent on FR1 may utilized to configure L2 and higher layers, along with mmWave PHY configurations for beam direction(s) and resource, timing, location, and/or sequence parameters for L1/L2 procedures. The source and target sidelink devices 602 and 604 may then perform PHY/MAC procedures in FR2 to select the BPL, perform synchronization, and establish the FR2 sidelink. For example, the source and target sidelink devices 602 and 604 may utilize the geographical locations (e.g., GPS coordinates) and V2X data exchanged during establishment of the FR1 sidelink to aid in selection of the BPL. Thus, signaling on the SRB on FR1 is used to establish the FR2 physical channel (FR2 sidelink) and to add a new DRB on FR2.

After considering QoS constraints and priorities, the source sidelink device 602 may then determine to transmit a data packet (or multiple data packets) to the target sidelink device 604 over the FR2 sidelink. At 612, the source sidelink device 602 may then generate and transmit a groupcast resource reservation message to the target sidelink device 604 and other neighboring sidelink devices 606 selected by the source sidelink device 602 to receive the groupcast message. The groupcast resource reservation message may be transmitted over FR1, and in some examples, may be a RRC message. Thus, the groupcast message may be addressed to each of the target sidelink device 604 and the selected other neighboring sidelink devices 606 and transmitted via respective FR1 sidelinks between the source sidelink device 602 and each of the target sidelink device 604 and the other neighboring sidelink devices 606.

The groupcast resource reservation message may include an indication of reserved resources (e.g., time-frequency resources) reserved by the source sidelink device 602 within FR2 for a future transmission of the data packet (or multiple data packets) to the target sidelink device 604. The other neighboring sidelink devices 606 may utilize the groupcast resource reservation message to manage interference on the reserved resources for additional sidelink communication. In some examples, the neighboring sidelink devices 606 may avoid utilizing the reserved resources for additional sidelink communication. For example, a neighboring sidelink device 606 may avoid reserving and/or scheduling resources within the reserved resources for an additional sidelink transmission from the neighboring sidelink device 606 to another sidelink device (e.g., another neighboring sidelink device or the source or target sidelink device).

At 614, the source sidelink device 602 may then generate and transmit a PSCCH including sidelink control information (SCI) over the FR2 sidelink. For example, the SCI may include scheduling information indicating the scheduled resources (e.g., time-frequency resources) scheduled within the reserved resources indicated by the groupcast resource reservation message for the transmission of the data packet on FR2. The SCI may further include HARQ information (e.g., HARQ ID and an indication whether the data packet is a new data packet or a retransmitted data packet) and other link adaptation information, such as the modulation and coding scheme (MCS) and power control commands.

At 616, the source sidelink device 602 may then transmit the data packet within a PSSCH to the target sidelink device 604 over the FR2 sidelink. In particular, the source sidelink device 602 may transmit the PSSCH on the scheduled resources indicated in the PSCCH. In addition, the source sidelink device 602 may utilize the BPL selected in 610 based on the device location information shared in 608. In some examples, one or more reference signals (e.g., a DMRS) may further be transmitted on the FR2 sidelink to enable channel estimation and feedback of channel state information (CSI). For example, the CSI may include a channel quality indicator (CQI), precoding matrix index (PMI), and a rank indicator (RI) for MIMO communications.

At 618, the target sidelink device 604 may transmit an acknowledgement (ACK) or negative acknowledgement (NACK) based on the HARQ information over a physical sidelink feedback control channel (PSFCH). In some examples, the target sidelink device 604 may transmit the PSFCH over the FR2 sidelink.

Figure 7:
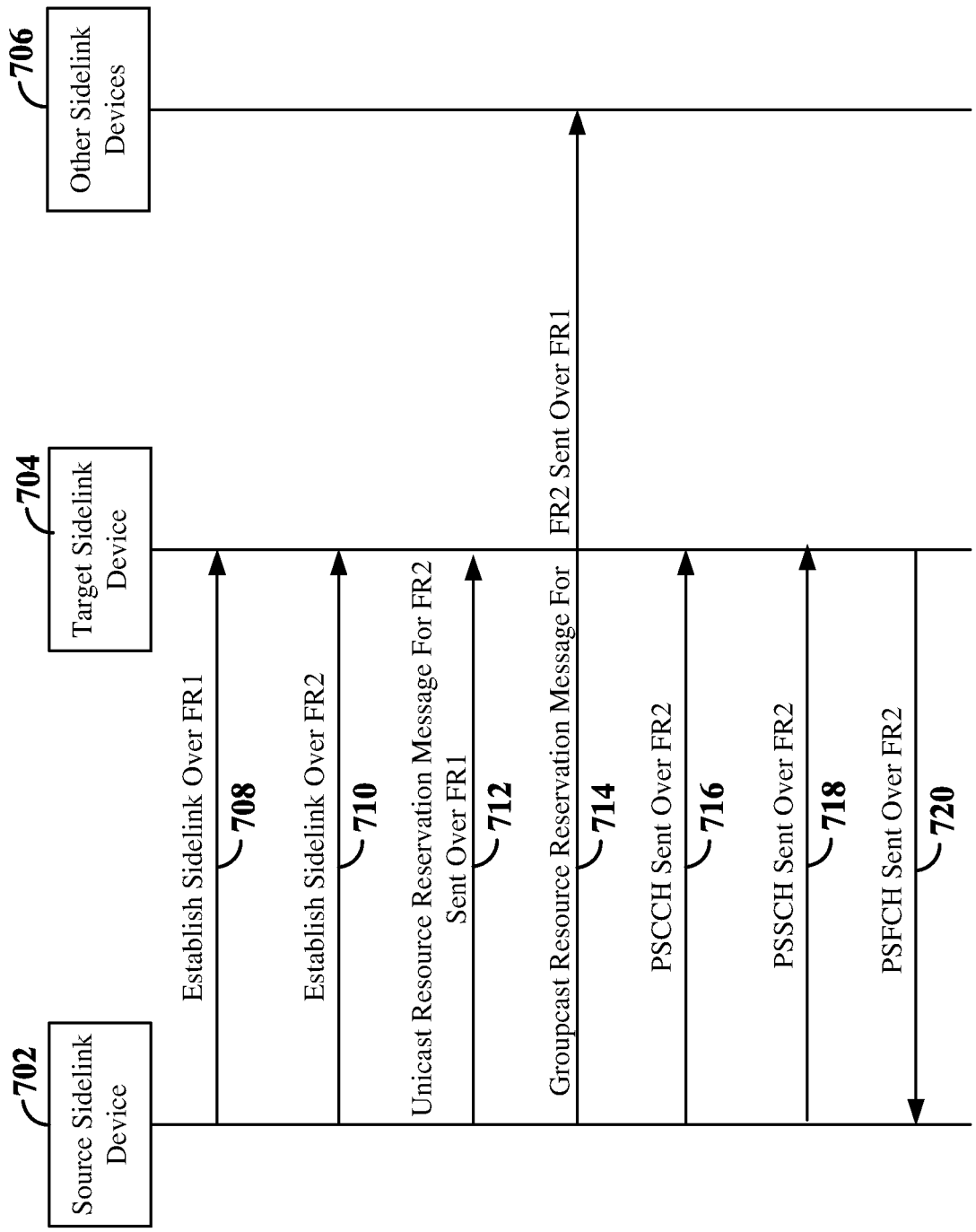
FIG. 7 is a signaling diagram illustrating another exemplary flow for performing cross-link resource reservation for a sidelink transmission.

FIG. 7 is a signaling diagram illustrating an exemplary flow for performing cross-link resource reservation for a sidelink transmission between sidelink devices 702 and 704 in, for example, a V2X NSA deployment including the sidelink devices 702 and 704 and other neighboring sidelink devices 706. The sidelink devices 702, 704, and 706 may correspond, for example, to sidelink devices shown in FIGS. 5 and/or 6, and/or V2X devices shown in FIG. 2. In the example shown in FIG. 7, sidelink device 702 may be referred to as the source sidelink device, while sidelink device 704 may be referred to as the target sidelink device.

At 708, the source and target sidelink devices 702 and 704 may initially establish a sidelink over a first frequency band FR1 (e.g., a sub-6 GHz frequency band), as described above in connection with FIGS. 5 and 6. At 710, the source and target sidelink devices 702 and 704 may further establish a sidelink over a second frequency band FR2 (e.g., a mmWave frequency band) using a NSA deployment, as described above in connection with FIGS. 5 and 6. For example, the FR2 sidelink may be established with the support of the previously established sidelink on FR1.

The source sidelink device 702 may then determine to transmit a data packet (or multiple data packets) to the target sidelink device 704 over the FR2 sidelink. At 712, the source sidelink device 702 may then generate and transmit a unicast resource reservation message to the target sidelink device 704 over the FR1 sidelink. The unicast resource reservation message may be, for example, a RRC message. The unicast resource reservation message may include an indication of reserved resources (e.g., time-frequency resources) reserved by the source sidelink device 702 within FR2 for a future transmission of the data packet (or multiple data packets) to the target sidelink device 704.

At 714, the source sidelink device 702 may further generate and transmit a groupcast resource reservation message to other neighboring sidelink devices 706 selected by the source sidelink device 702 to receive the groupcast message. The groupcast resource reservation message may be transmitted over FR1 and may, in some examples, be a RRC message. Thus, the groupcast message may be addressed to each of the selected other neighboring sidelink devices 706 and transmitted via respective FR1 sidelinks between the source sidelink device 702 and each of the other neighboring sidelink devices 706. In some examples, the groupcast resource reservation message may include the same information as in the unicast resource reservation message. In other examples, the groupcast resource reservation message may include additional information over that which is included in the unicast resource reservation message. For example, the groupcast resource reservation message may further include geographical location information associated with the source sidelink device 702 and the target sidelink device 704.

The other neighboring sidelink devices 706 may utilize the groupcast resource reservation message to manage interference on the reserved resources for additional sidelink communication. In some examples, the neighboring sidelink devices 706 may avoid utilizing the reserved resources for additional sidelink communication. For example, a neighboring sidelink device 706 may avoid reserving and/or scheduling resources within the reserved resources for an additional sidelink transmission from the neighboring sidelink device 706 to another sidelink device (e.g., another neighboring sidelink device or the source or target sidelink device).

At 716, the source sidelink device 702 may then generate and transmit a PSCCH including sidelink control information (SCI) over the FR2 sidelink. For example, the SCI may include scheduling information indicating the scheduled resources (e.g., time-frequency resources) scheduled within the reserved resources indicated by the unicast/groupcast resource reservation message for the transmission of the data packet on FR2. The SCI may further include HARQ information (e.g., HARQ ID and an indication whether the data packet is a new data packet or a retransmitted data packet) and other link adaptation information, such as the modulation and coding scheme (MCS) and power control commands.

At 718, the source sidelink device 702 may then transmit the data packet within a PSSCH to the target sidelink device 704 over the FR2 sidelink. In particular, the source sidelink device 702 may transmit the PSSCH on the scheduled resources indicated in the PSCCH. In addition, the source sidelink device 702 may utilize the BPL selected in 710 based on the device location information shared in 708. In some examples, one or more reference signals (e.g., a DMRS) may further be transmitted on the FR2 sidelink to enable channel estimation and feedback of channel state information (CSI). For example, the CSI may include a channel quality indicator (CQI), precoding matrix index (PMI), and a rank indicator (RI) for MIMO communications.

At 720, the target sidelink device 704 may transmit an acknowledgement (ACK) or negative acknowledgement (NACK) based on the HARQ information over a physical sidelink feedback control channel (PSFCH). In some examples, the target sidelink device 704 may transmit the PSFCH over the FR2 sidelink.

In some examples, the unicast resource reservation message shown in FIG. 7 or the groupcast resource reservation message shown in FIG. 6 may function as a paging message to the target sidelink device 604/704 to activate the FR2 sidelink with the target sidelink device and wake-up the target sidelink device for the subsequent sidelink transmission. For example, the FR2 sidelink may be semi-statically configured with an active transmit/receive schedule, but due to lack of active data transmissions, the FR2 sidelink may be deactivated. The paging resource reservation message may effectively page the target sidelink device to activate the FR2 sidelink and wake-up the target sidelink device without the need to explicitly configure a discontinuous reception (DRX) cycle on the target sidelink device.

In some examples, the unicast resource reservation message shown in FIG. 7 or the groupcast resource reservation message shown in FIG. 6 may function as a semi-persistently scheduled (SPS) activation or deactivation message. SPS enables periodic scheduling information (e.g., periodic time-frequency resources) to be signaled just once on the PSCCH, and then subsequently, without the need to transmit additional scheduling information, the sidelink devices may utilize the periodic time-frequency resources for sidelink transmissions. The periodicity with which the sidelink devices may transmit/receive data via the semi-persistently scheduled resources may be established when the SPS assignment is initially configured. Once configured, in order to begin using the SPS assignment, the source sidelink device 602/702 may transmit an SPS activation message to activate the SPS assignment and enable the source sidelink device to utilize the SPS assignment.

In some examples, the resource reservation message (e.g., unicast or groupcast) may function as an SPS activation message to activate a previously configured SPS assignment including the reserved resources. In other examples, the resource reservation message (e.g., unicast or groupcast) may function as an SPS deactivation message to deactivate a previously configured SPS assignment including the reserved resources.

In some examples, the SPS assignment may be previously configured, for example, via RRC signaling over the FR1 sidelink based on expected data traffic on the FR2 sidelink. For example, the source sidelink device 602/702 may configure one or more SPS assignments on the FR2 sidelink, each with different SPS schedules, via the FR1 sidelink based on expected data traffic on the FR2 sidelink. In other examples, the SPS assignment may be configured, for example, based on a V2X application profile. For example, a V2X application running on the source sidelink device 602/702 may configure the SPS assignment for data traffic associated with the V2X application. In other examples, the SPS assignment may be configured, for example, for the occurrence of a V2X event (e.g., lane change, approaching a street intersection, braking, etc.). In this example, the resource reservation message may then be transmitted as an SPS activation message upon the occurrence of the particular V2X event.

Figure 8:
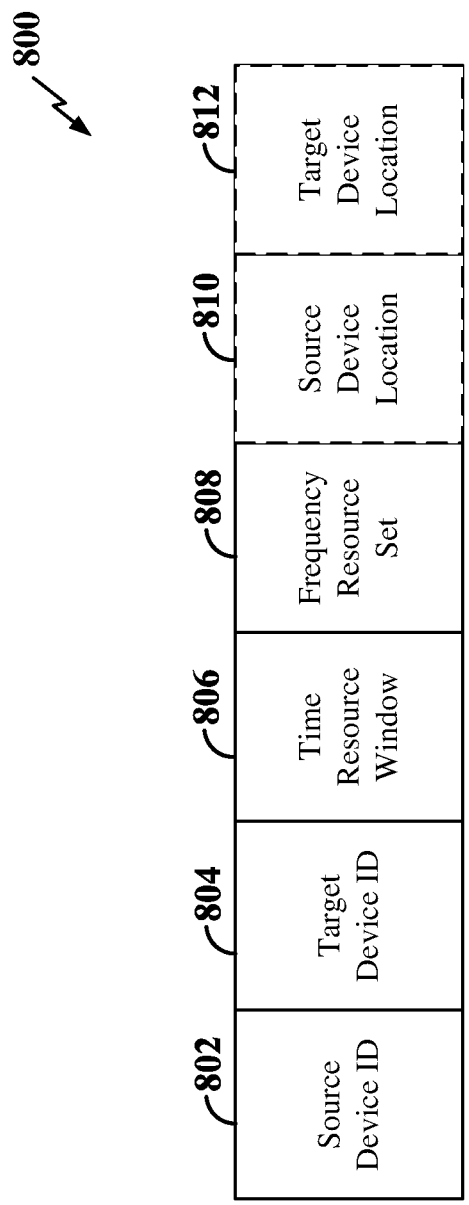
FIG. 8 is a diagram illustrating an exemplary format of resource reservation message for cross-link resource reservation.

FIG. 8 is a diagram illustrating an exemplary format of resource reservation message 800 for cross-link resource reservation for a subsequent sidelink transmission of one or more data packets. The resource reservation message 800 may be a unicast resource reservation message or a groupcast resource reservation message. The resource reservation message 800 includes a source device identifier (ID) 802 identifying a source sidelink device generating and transmitting the resource reservation message. The resource reservation message 800 further includes a target device ID 804 identifying a target sidelink device for the subsequent sidelink transmission. In examples in which the resource reservation message is a groupcast resource reservation message, the resource reservation message 800 may further include the device ID of each neighboring sidelink device to which the groupcast message is directed.

The resource reservation message 800 further includes a time resource window 806 indicating a start time and a duration of time reserved for the subsequent sidelink transmission. In some examples, the time resource window 806 may include a starting slot number and an ending slot number reserved for the subsequent sidelink transmission. In other examples, the time resource window 806 may include a starting slot number and a number of sequential slots after the starting slot number reserved for the subsequent sidelink transmission. In still other examples, the time resource window 806 may include a starting OFDM symbol number within a starting slot number and ending OFDM symbol number within an ending slot number.

The resource reservation message 800 further includes a frequency resource set 808 (e.g., a set of frequency resources) reserved for the subsequent sidelink transmission within the time resource window 806. In some examples, the frequency resource set may indicate a starting resource block within FR2 and a number of sequential resource blocks after the starting resource block within FR2 reserved for the subsequent sidelink transmission. In other examples, the frequency resource set may indicate a starting resource block within FR2 and an ending resource block within FR2 reserved for the subsequent sidelink transmission.

In some examples, the time resource window 806 and frequency resource set 808 correspond to at least one instance of periodic time-frequency resources for an SPS assignment. In this example, the time resource window 806 and frequency resource set 808 may be previously configured via RRC signaling over the FR1 sidelink, and as such, the inclusion of the time resource window 806 and frequency resource set 808 may enable the target sidelink device to consider the resource reservation message an SPS activation message. As another example, the time resource window 806 and frequency resource set 808 may be omitted from the resource reservation message when the resource reservation message is an SPS activation message including, for example, an SPS activation indicator (not shown). In other examples, the resource reservation message 800 may function as an SPS deactivation message for an SPS assignment that included the time resource window 806 and frequency resource set 808. For example, by including the time resource window 806 and frequency resource set 808 previously configured for an SPS assignment within the resource reservation message, the target sidelink device may consider the resource reservation message an SPS deactivation message for the SPS assignment.

The resource reservation message 800 further includes an optional source device location 810 and an optional target device location 812. The source and target device locations 810 and 812 may include, for example, physical geographical locations (e.g., coordinates) of the source sidelink device and the target sidelink device. In some examples, the source and target device locations 810 and 812 may be determined during the device discovery procedure performed to establish the FR1 sidelink. In examples in which the resource reservation message 800 is a unicast resource reservation message, the source and target device locations 810 and 812 may be omitted.

Figure 9:
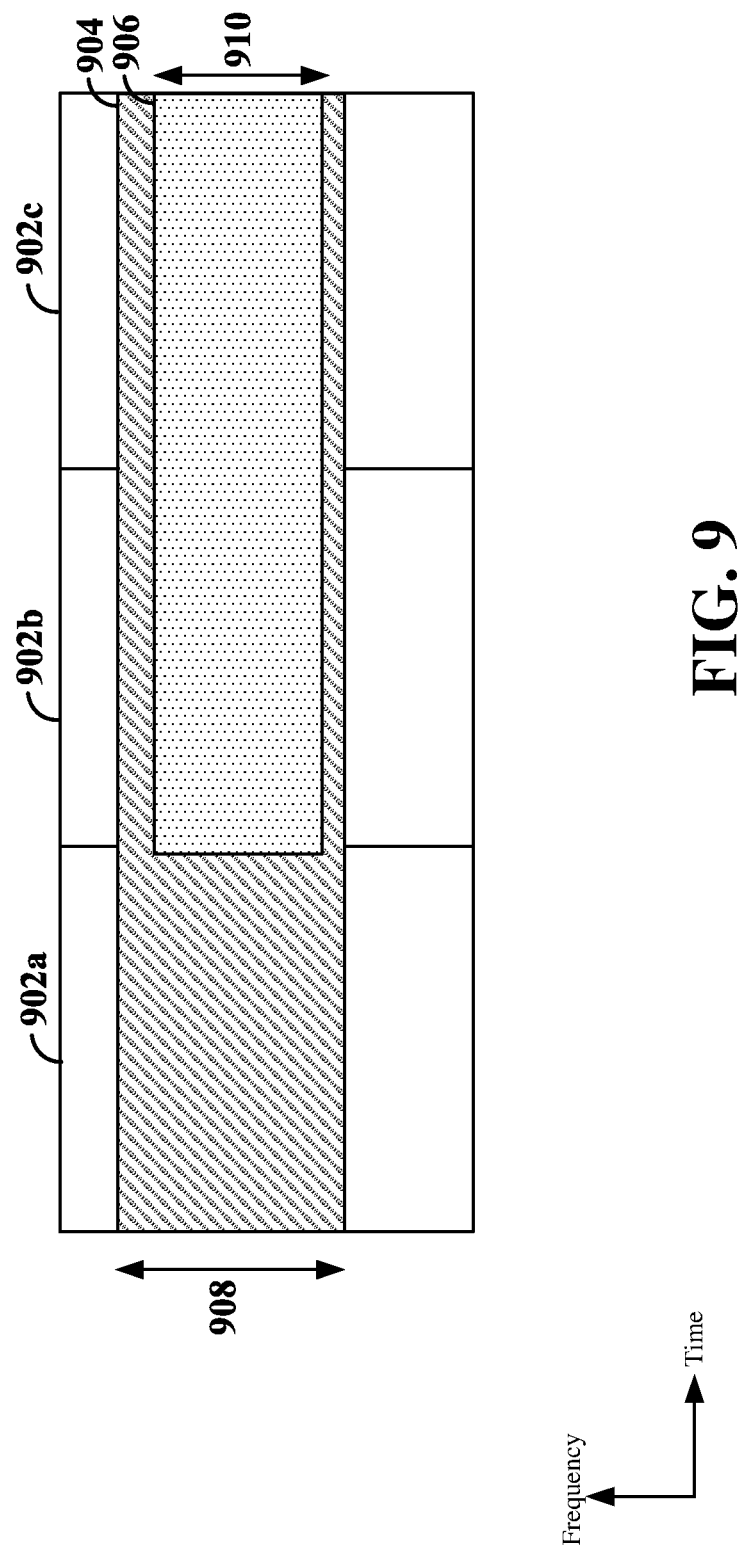
FIG. 9 is a diagram illustrating exemplary reserved and scheduled resources for a sidelink transmission.

FIG. 9 is a diagram illustrating exemplary reserved resources 904 and scheduled resources 906 for a sidelink transmission. The reserved resources 904 include time-frequency resources reserved for a subsequent sidelink transmission, whereas the scheduled resources 906 include time-frequency resources within the reserved resources 904 scheduled for the transmission of a PSCCH and PSSCH associated with the sidelink transmission. A target sidelink device may beamform towards a source sidelink device during the reserved resources 904 to receive the PSCCH and PSSCH over the scheduled resources 906.

The reserved resources 904 include a time resource window corresponding to a first number of slots (e.g., slots 902a-902c) and a first set of frequency resources 908 corresponding to a first number of RBs reserved for the subsequent sidelink transmission. The scheduled resources 906 include a second number of slots (e.g., slots 902b and 902c) and a second set of frequency resources 910 (e.g., a second number of RBs) within the reserved resources 904 on which the PSCCH and PSSCH are transmitted. In the example shown in FIG. 9, the scheduled resources 906 include fewer than all of the reserved resources 904 for the sidelink transmission. It should be understood though that, in other examples, the scheduled resources 906 may include all of the reserved resources 904.

Figure 10:
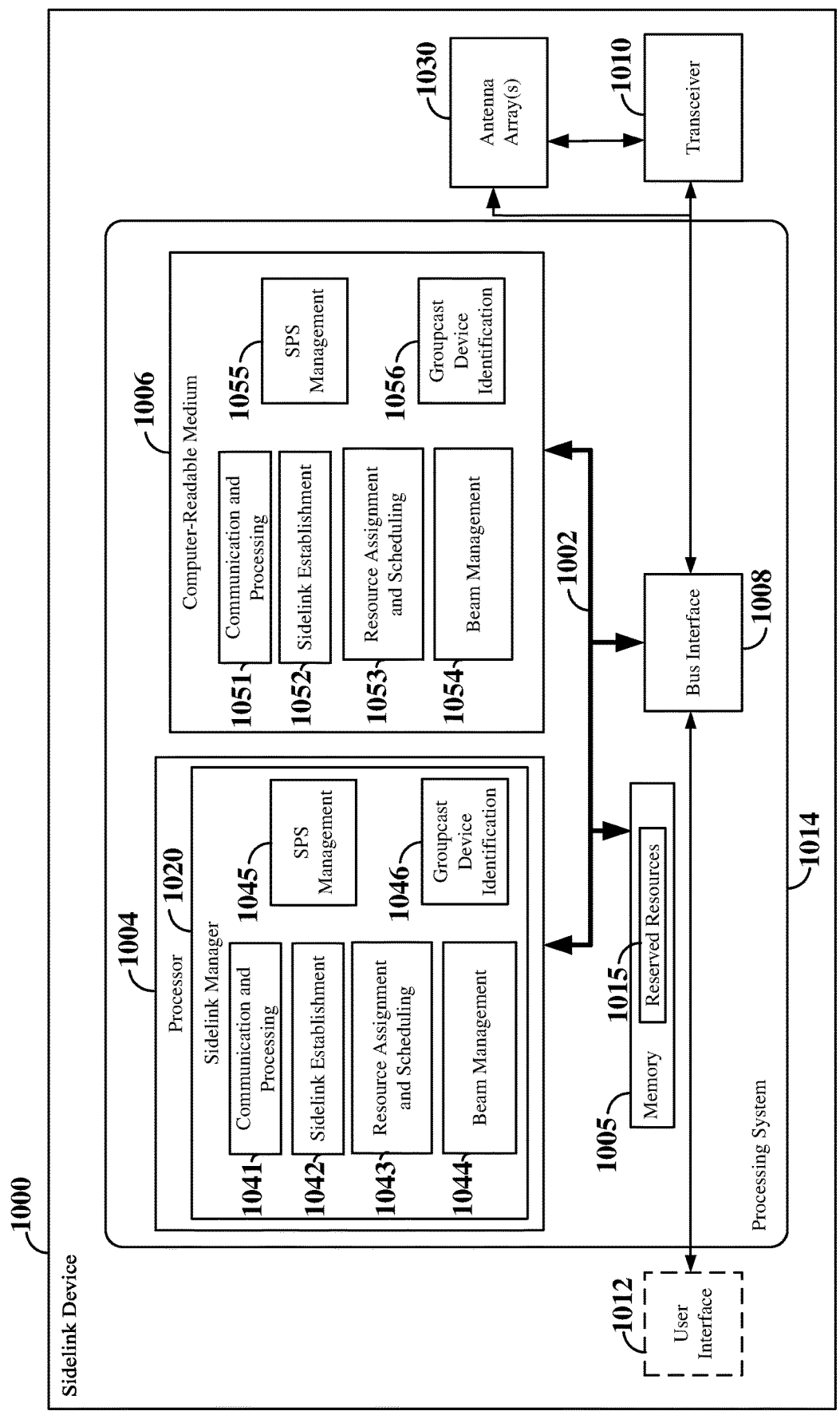
FIG. 10 is a diagram illustrating an example of a hardware implementation for a sidelink device employing a processing system.

FIG. 10 is a block diagram illustrating an example of a hardware implementation for a sidelink device 1000 employing a processing system 1014. For example, the sidelink device 1000 may correspond to a UE or a V2X device, as shown and described above in reference to FIGS. 1, 2, 5, 6 and/or 7.

The sidelink device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the sidelink device 1000 may be configured to perform any one or more of the functions described herein. That is, the processor 1004, as utilized in the sidelink device 1000, may be used to implement any one or more of the processes and procedures described below.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a transceiver 1010. The transceiver 1010 provides a means for communicating with various other apparatus over a transmission medium (e.g., air interface). Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include sidelink manager circuitry 1020 configured to establish and manage one or more sidelinks. For example, the sidelink manager circuitry 1020 may include communication and processing circuitry 1041 configured to communicate over a sidelink carrier to exchange sidelink control information and sidelink data with other sidelink devices via the transceiver 1010 using an associated antenna and/or antenna array(s) 1030. In some examples, the communication and processing circuitry 1041 may be configured to communicate with other sidelink devices over multiple sidelink carriers, each associated with one or more sidelinks. For example, the communication and processing circuitry 1041 may be configured to communicate over an FR1 carrier (e.g., a sub-6 GHz carrier) and an FR2 carrier (e.g., a mmWave carrier).

Each sidelink carrier may be time-divided into a plurality of radio frames, each of which may be time-divided into a plurality of subframes and slots, such as the slots shown in FIGS. 3 and 9. In some examples, the communication and processing circuitry 1041 may be configured to transmit a sidelink control channel (e.g., a PSCCH), which may include sidelink control information (SCI) including scheduled resources for the transmission of data. The PSCCH may further include a sidelink synchronization signal (S-SS), other control information, and/or pilot signals. The communication and processing circuitry 1041 may further be configured to transmit a sidelink data channel (e.g., a PSSCH), which may include the data referenced in the PSCCH. In some examples, the communication and processing circuitry 1041 may be configured to transmit the PSCCH within a slot on the FR2 carrier, and the PSSCH within one or more slots on the FR2 carrier. In addition, the communication and processing circuitry 1041 may further be configured to receive a sidelink feedback channel (e.g., a PSFCH) from the other sidelink device within a slot on the FR2 carrier.

In other examples, the communication and processing circuitry 1041 may be configured to transmit the sidelink control channel on the FR1 carrier, and the PSSCH within one or more slots on the FR2 carrier. In addition, the communication and processing circuitry 1041 may further be configured to receive a sidelink feedback channel within a slot on the FR1 carrier.

In examples in which the sidelink device 1000 is a source sidelink device, the communication and processing circuitry 1041 may further be configured to transmit a resource reservation message on the FR1 carrier. The resource reservation message may indicate reserved resources on the FR2 carrier for the subsequent transmission of a PSCCH and PSSCH to a target sidelink device. In some examples, the resource reservation message may include a groupcast resource reservation message transmitted to two or more other sidelink devices, including the target sidelink device. In other examples, the resource reservation message may include both a unicast resource reservation message transmitted to the target sidelink device and a groupcast resource reservation message transmitted to one or more neighboring sidelink devices other than the target sidelink device. In other examples, the resource reservation message may include a broadcast resource reservation message that may be broadcast to multiple receiving sidelink devices regardless of whether a respective sidelink has been established with each of the receiving sidelink devices.

In some examples, the unicast or groupcast resource reservation message may function as a paging message to the target sidelink device to activate the FR2 sidelink with the target sidelink device and wake-up the target sidelink device for the subsequent sidelink transmission. In other examples, the unicast or groupcast resource reservation message may function as a semi-persistently scheduled (SPS) activation message to activate a previously configured SPS assignment including the reserved resources or an SPS deactivation message to deactivate a previously configured SPS assignment including the reserved resources.

In other examples, the communication and processing circuitry 1041 may further be configured to transmit a resource reservation message on the FR2 carrier. In this example, the resource reservation message may indicate reserved resources on the FR1 carrier for the subsequent transmission of a PSCCH and PSSCH to a target sidelink device. In an example implementation, the sidelink device 1000 may be aware of interference on the FR1 carrier, and therefore, may determine to transmit the resource reservation message to the target sidelink device on the FR2 carrier to assist the target sidelink device in receiving the PSCCH and PSSCH on the FR1 carrier. Other configurations and implementations using FR2 to reserve resources on FR1 are within the scope of the disclosure.

In examples in which the sidelink device 1000 is a receiving sidelink device (e.g., a target or neighbor sidelink device), the communication and processing circuitry 1041 may be configured to receive the resource reservation message on the FR1 carrier via a FR1 sidelink with the source sidelink device. As a target sidelink device, the communication and processing circuitry 1041 may further be configured to receive the PSCCH within a slot on the FR2 carrier via an FR2 sidelink with the source sidelink device. The communication and processing circuitry 1041 may further be configured to receive the PSSCH within a slot on the FR2 carrier via the FR2 sidelink with the source sidelink device. Furthermore, the communication and processing circuitry 1041 may be configured to transmit the PSFCH within a slot on the FR2 carrier via the FR2 sidelink with the source sidelink device.

In other examples, the communication and processing circuitry 1041 may further be configured to receive the resource reservation message on the FR2 carrier via the FR2 sidelink with the source sidelink device. In this example, the resource reservation message may indicate reserved resources on the FR1 carrier for the subsequent transmission of a PSCCH and PSSCH to the target sidelink device. Thus, the communication and processing circuitry 1041 may further be configured to receive the PSCCH within a slot on the FR1 carrier via the FR1 sidelink with the source sidelink device and to further receive the PSSCH within a slot on the FR1 carrier via the FR1 sidelink. In addition, the communication and processing circuitry 1041 may further be configured to transmit the PSFCH within a slot on the FR1 carrier via the FR1 sidelink. The communication and processing circuitry 1041 may further be configured to execute communication and processing software 1051 stored on the computer-readable medium 1006 to implement one or more functions described herein.

The sidelink manager circuitry 1020 may further include sidelink establishment circuitry 1042, configured to establish one or more sidelinks with other sidelink devices on one or more sidelink carriers. In some examples, the sidelink establishment circuitry 1042 may be configured to establish an FR1 sidelink over the FR1 sidelink carrier (e.g., on the sub-6 GHz frequency band) with a target sidelink device, as described above in connection with FIGS. 5, 6 and/or 7. In some examples, the FR1 sidelink may utilize an omni-directional beam to communicate with the target sidelink.

The sidelink establishment circuitry 1042 may further be configured to establish an FR2 sidelink over the FR2 sidelink carrier (e.g., on the mmWave frequency band) with the target sidelink device using a NSA deployment, as described above in connection with FIGS. 5, 6 and/or 7. For example, the FR2 sidelink with the target sidelink device may be established with the support of the previously established sidelink on FR1 with the same target sidelink device. In particular, the SRB established on FR1 may be utilized to establish a DRB on FR2. In some examples, the FR2 sidelink may utilize a directional beam to communicate with the target sidelink device on the FR2 sidelink.

Upon establishing the FR1 sidelink and the FR2 sidelink with the target sidelink device, the communication and processing circuitry 1041 may be configured to communicate over each of the FR1 sidelink and the FR2 sidelink to transmit the resource reservation message, the PSCCH, and the PSSCH to the target sidelink device, as discussed above. In some examples, the communication and processing circuitry 1041 may further be configured to transmit the resource reservation message to other neighboring sidelink devices within range of the omni-directional beam via respective FR1 sidelinks with the neighboring sidelink devices. In addition, the communication and processing circuitry 1041 may be configured to communicate with the neighboring sidelink devices via respective directional FR2 beams and FR2 sidelinks established by the sidelink establishment circuitry 1042. The sidelink establishment circuitry 1042 may further be configured to execute sidelink establishment software 1052 stored on the computer-readable medium 1006 to implement one or more functions described herein.

The sidelink manager circuitry 1020 may further include resource assignment and scheduling circuitry 1043, configured to generate, schedule, and modify a reservation of time-frequency resources (e.g., a set of one or more RBs) for a sidelink transmission. For example, the resource assignment and scheduling circuitry 1043 may identify time-frequency resources on the FR2 carrier that may be reserved for a subsequent sidelink transmission to a target sidelink device. The reserved resources may include, for example, one or more slots and one or more RBs over which the source sidelink device 1000 may subsequently transmit a PSCCH and PSSCH to the target sidelink device. The resource assignment and scheduling circuitry 1043 may identify the reserved resources based on, for example, resource reservation messages received from other neighboring sidelink devices and/or PDCCH indicating scheduled resources on the FR2 carrier received from other neighboring sidelink devices.

The resource assignment and scheduling circuitry 1043 may then schedule time-frequency resources on FR1 to carry a resource reservation message (e.g., an RRC message) to a target sidelink device and other neighboring sidelink devices indicating the reserved resources on the FR2 carrier for the subsequent sidelink transmission to the target sidelink device. In some examples, the resource assignment and scheduling circuitry 1043 may schedule respective time-frequency resources on the FR1 carrier to transmit both a unicast resource reservation message to the target sidelink device and a groupcast resource reservation message to the other neighboring sidelink device. In other examples, the resource assignment and scheduling circuitry 1043 may schedule time-frequency resources on the FR1 carrier to transmit a groupcast resource reservation message to both the target sidelink device and the neighboring sidelink devices.

The resource reservation and scheduling circuitry 1043 may further be configured to schedule time-frequency resources within the reserved resources on the FR2 carrier to transmit a PSCCH and a PSSCH to the target sidelink device. In addition, the resource reservation and scheduling circuitry 1043 may further be configured to schedule time-frequency resources for the target sidelink device to transmit a PSFCH to the source sidelink device 1000. In some examples, the source sidelink device may schedule the PSFCH resources. In other examples, the target sidelink device may schedule the PSFCH resources. The resource assignment and scheduling circuitry 1043 may further be configured to utilize an omni-directional beam to carry the resource reservation message on the FR1 carrier and a directional beam (e.g., a selected BPL) to carry the PSCCH and the PSSCH on the FR2 carrier. Similarly, the resource assignment and scheduling circuitry 1043 may be configured to schedule resources on the FR1 carrier for the transmission of resource reservation message and to schedule resources within the reserved resources on the FR1 carrier to transmit a PSCCH and PSSCH and to transmit the PSFCH.

In some examples, the resource assignment and scheduling circuitry 1043 may further be configured to manage interference on the reserved resources indicated in the resource reservation message. For example, the resource assignment and scheduling circuitry 1043 may be configured to avoid scheduling another PSCCH and/or PSSCH within the reserved resources on the FR2 carrier. In some examples, the communication and processing circuitry 1041 may be configured to receive a resource reservation message transmitted by a source sidelink device on FR1 (e.g., via an FR1 sidelink between the source sidelink device and the sidelink device 1000). The resource assignment and scheduling circuitry 1043 may then avoid reserving the same resources for another sidelink transmission and/or scheduling another PSCCH and/or PSSCH within the reserved resources on the FR2 carrier indicated by the resource reservation message. The resource assignment and scheduling circuitry 1043 may further be configured to execute resource assignment and scheduling software 1053 stored on the computer-readable medium 1006 to implement one or more of the functions described herein.

The sidelink manager circuitry 1020 may further include beam management circuitry 1044, configured to select a particular beam (or BPL) for a communication with another sidelink device. In some examples, the beam management circuitry 1044 may be configured to select an omni-directional beam when the communication is to be transmitted over the FR1 and a BPL when the communication is to be transmitted over the FR2. In some examples, the particular BPL between the sidelink device 1000 and another sidelink device may be selected based on shared device location information exchanged between the sidelink devices during setup of the FR2 sidelink. The beam management circuitry 1044 may further be configured to execute beam management software 1054 stored on the computer-readable medium 1006 to implement one or more of the functions described herein.

The sidelink manager circuitry 1020 may further include SPS management circuitry 1045, configured to configure one or more SPS assignments for sidelink data, such as V2X data. In some examples, the SPS management circuitry 1045 may be configured to operate in coordination with the communication and processing circuitry 1041 and resource assignment and scheduling circuitry 1043 to configure an SPS assignment for sidelink data periodically communicated over the FR2 sidelink based on expected data traffic on the FR2 sidelink. In this example, the communication and processing circuitry 1041, together with the resource assignment and scheduling circuitry 1043, may configure the SPS assignment on the source and target sidelink devices via RRC signaling over the FR1 sidelink. The SPS assignment enables the communication and processing circuitry 1041 to periodically transmit sidelink data to the target sidelink device within the periodic resources reserved on the FR2 sidelink.

In some examples, the SPS management circuitry 1045 may instruct the communication and processing circuitry 1041, together with the resource assignment and scheduling circuitry 1043, to configure two or more SPS assignments on the FR2 sidelink, each with different SPS schedules, via the FR1 sidelink based on expected data traffic on the FR2 sidelink. For example, the SPS management circuitry 1045 may configure an SPS assignment based on a V2X application profile (e.g., a profile of a V2X application stored, for example, in the computer-readable medium 1006 or in a different memory device on the sidelink device 1000). For example, the SPS management circuitry 1045 may configure the SPS assignment for the occurrence of a V2X event (e.g., lane change, approaching a street intersection, braking, etc.) that may be detected by the V2X application.

After configuration of the SPS assignment, the SPS management circuitry 1045 may then trigger transmission of an SPS activation message by the communication and processing circuitry 1041 to activate the SPS assignment to enable the source sidelink device to transmit periodic sidelink data on the FR2 sidelink. In some examples, the communication and processing circuitry 1041 may transmit the resource reservation message, functioning as an SPS activation message. In this example, the periodic resources associated with the SPS assignment may include the reserved resources indicated by the resource reservation message. Therefore, the inclusion of the reserved resources in the resource reservation message may trigger activation of the SPS assignment at the target sidelink device. In other examples, the resource reservation message may include an SPS activation indicator to specifically activate the SPS assignment. In this example, the resource reservation message may not include the reserved resources (e.g., the reserved resources were previously reserved during SPS configuration). In this example, the SPS management circuitry 1045 may trigger transmission of the SPS activation message upon the occurrence of a particular V2X event associated with the SPS assignment.

The SPS management circuitry 1045 may further trigger transmission of an SPS deactivation message by the communication and processing circuitry 1041 to deactivate the SPS assignment. In some examples, the communication and processing circuitry 1041 may transmit the resource reservation message, functioning as an SPS deactivation message. In this example, the periodic resources associated with the SPS assignment may include the reserved resources indicated by the resource reservation message. Therefore, the inclusion of the reserved resources in the resource reservation message may trigger deactivation of the SPS assignment at the target sidelink device. In other examples, the resource reservation message may further include a specific SPS deactivation indicator to deactivate the SPS assignment and make the reserved resources available for other sidelink data. The SPS management circuitry 1045 may further be configured to execute SPS management software 1055 stored on the computer-readable medium 1006 to implement one or more of the functions described herein.

The sidelink manager circuitry 1020 may further include groupcast device identification circuitry 1046, configured to identify and select other neighboring sidelink devices to receive a groupcast resource reservation message. In some examples, the groupcast device identification circuitry 1046 may select all neighboring sidelink devices with which the source sidelink device 1000 has an active FR1 sidelink to receive the groupcast resource reservation message. In other examples, the groupcast device identification circuitry 1046 select neighboring sidelink devices to receive a groupcast resource reservation message based on the geographical location of each potential neighboring sidelink device (e.g., based on the geographical location information exchanged during the establishment of respective FR1 sidelinks with each of the neighboring sidelink devices). In this example, the groupcast device identification circuitry 1046 may select less than all of the other neighboring sidelink devices with which the source sidelink device 1000 has an active FR1 sidelink. For example, the groupcast device identification circuitry 1046 may select the other neighboring sidelink devices that may have FR2 sidelinks that could interfere with the FR2 sidelink between the source sidelink device 1000 and the target sidelink device. The groupcast device identification circuitry 1046 may further be configured to execute groupcast device identification software 1056 stored on the computer-readable medium 1006 to implement one or more of the functions described herein.

Figure 11:
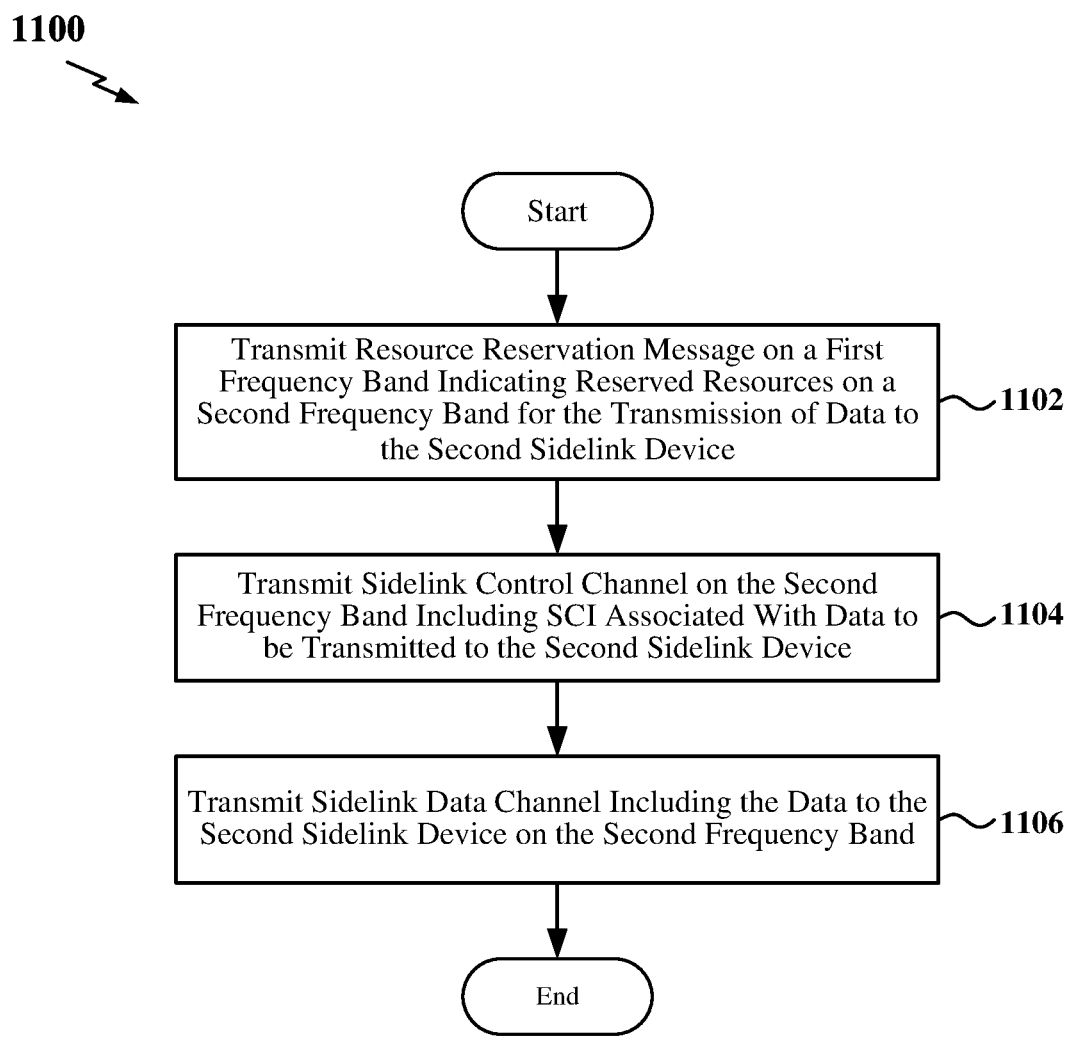
FIG. 11 is a flow chart of an exemplary method for wireless communication at a transmitting sidelink device.

FIG. 11 is a flow chart 1100 of an exemplary method for wireless communication at a transmitting sidelink device. As described below, some or all illustrated features may be omitted in a particular implementation within the scope of the present disclosure, and some illustrated features may not be required for implementation. In some examples, the method may be performed by the sidelink device 1000, as described above and illustrated in FIG. 10, by a processor or processing system, or by any suitable means for carrying out the described functions.

At block 1102, a first sidelink device (e.g., a transmitting sidelink device) may transmit a resource reservation message on a first frequency band including a first carrier frequency indicating reserved resources on a second frequency band including a second carrier frequency for the transmission of user data traffic (e.g., V2X data or other sidelink data) to a second sidelink device (e.g., a receiving sidelink device). In some examples, the first frequency band may correspond to a FR1 band (e.g., a sub-6 GHz frequency band) and the second frequency band may correspond to a FR2 band (e.g., a millimeter wave frequency band). In other examples, the first frequency band may correspond to a FR2 band, while the second frequency band may correspond to a FR1 band.

In some examples, the resource reservation message may be a unicast message transmitted to the second sidelink device. In other examples, the resource reservation message may be a groupcast message transmitted to the second sidelink device and other neighboring sidelink devices. In still other examples, the resource reservation message may include both a unicast message transmitted to the second sidelink device and a groupcast message or broadcast message transmitted to other neighboring devices. In some examples, the resource reservation message may be transmitted via an omni-directional beam. In other examples, the resource reservation message may be transmitted via a directional beam (e.g., BPL) towards the second sidelink device.

In some examples, the resource reservation message may function as a paging message to activate a second sidelink established on the second frequency band with the second sidelink device and to wake-up the second sidelink device. In this example, the first sidelink device may establish a first sidelink between the first sidelink device and the second sidelink device over the first frequency band. The first sidelink device may further establish the second sidelink at least in part utilizing the first sidelink. For example, the second sidelink may be established utilizing the first sidelink based on, for example, a V2X NSA deployment.

In some examples, the resource reservation message may function as an SPS activation or deactivation message. For example, the resource reservation message may be an SPS message activating or deactivating a semi-persistently configured assignment of periodic resources including the reserved resources. For example, the resource assignment and scheduling circuitry 1043, communication and processing circuitry 1041, beam management circuitry 1044, sidelink establishment circuitry 1042, and transceiver 1010 shown and described above in connection with FIG. 10 may generate and transmit the resource reservation message.

At block 1104, the first sidelink device may transmit a sidelink control channel (e.g., a PSCCH) on the second frequency band including SCI associated with the user data traffic to be transmitted to the second sidelink device on the second frequency band. The SCI may include scheduling information indicating scheduled resources within the reserved resources within which the user data traffic will be transmitted. In some examples, the PSCCH may be transmitted via a directional beam (e.g., BPL) towards the second sidelink device. In other examples, the PSCCH may be transmitted via an omni-directional beam.

In some examples, the reserved resources may include a time resource window indicating a starting time and duration of time and a set of frequency resources indicating a starting resource block and a number of resource blocks. In this example, the PSCCH may be transmitted during the time resource window and within the set of frequency resources. For example, the resource assignment and scheduling circuitry 1043, communication and processing circuitry 1041, beam management circuitry 1044, and transceiver 1010, shown and described above in connection with FIG. 10 may generate and transmit the PSCCH on the second frequency band to the second sidelink device.

At block 1106, the first sidelink device may transmit a sidelink data channel (e.g., a PSSCH) including the user data traffic to the second sidelink device on the second frequency band. In some examples, the PSSCH may be transmitted via a directional beam (e.g., a BPL) towards the second sidelink device. In other examples, the PSSCH may be transmitted via an omni-directional beam. In some examples, the PSSCH may be transmitted during the time resource window and within the set of frequency resources indicated by the resource reservation message. For example, the resource assignment and scheduling circuitry 1043, communication and processing circuitry 1041, beam management circuitry 1044, and transceiver 1010 shown and described above in connection with FIG. 10 may transmit the PSSCH on the second frequency band to the second sidelink device.

Figure 12:
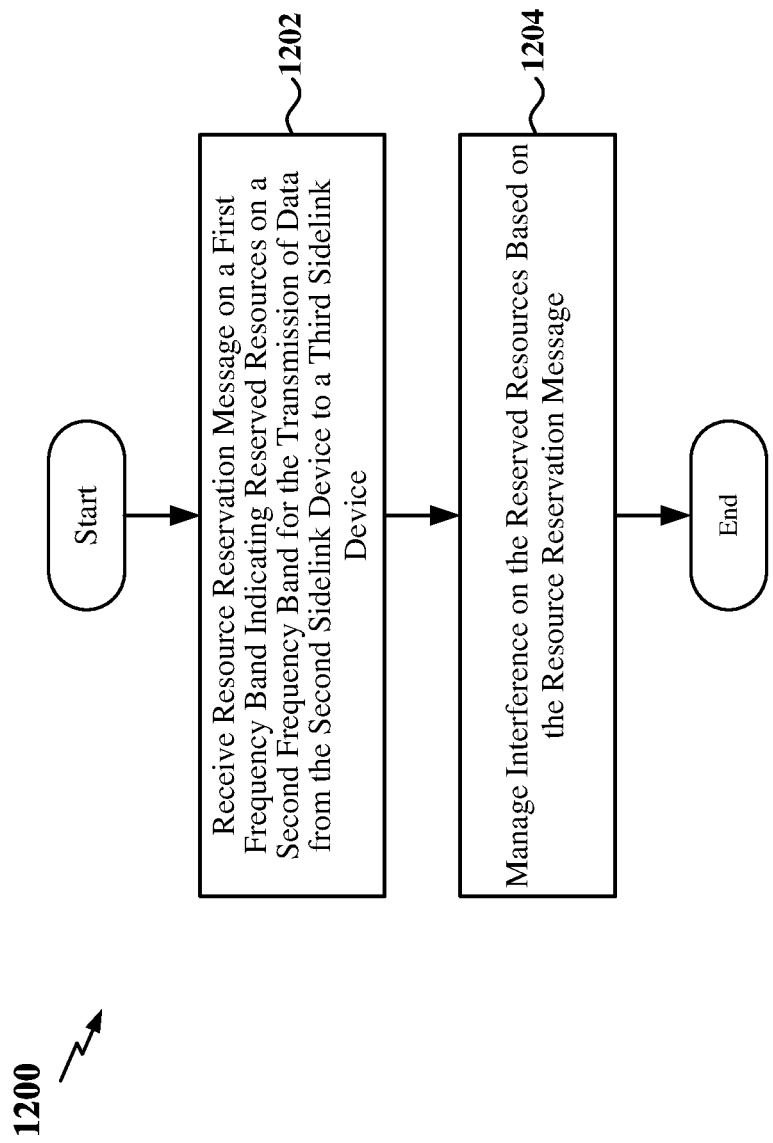
FIG. 12 is a flow chart of an exemplary method for wireless communication at a receiving sidelink device.

FIG. 12 is a flow chart 1200 of an exemplary method for wireless communication at a receiving sidelink device. As described below, some or all illustrated features may be omitted in a particular implementation within the scope of the present disclosure, and some illustrated features may not be required for implementation. In some examples, the method may be performed by the sidelink device 1000, as described above and illustrated in FIG. 10, by a processor or processing system, or by any suitable means for carrying out the described functions.

At block 1202, a first sidelink device (e.g., a receiving sidelink device) may receive a resource reservation message on a first frequency band including a first carrier frequency from a second sidelink device (e.g., a transmitting sidelink device). The resource reservation message may include an indication of reserved resources on a second frequency band including a second carrier frequency for the transmission of user data traffic (e.g., V2X data or other sidelink data) from the second sidelink device to a third sidelink device (e.g., a target sidelink device). In some examples, the first frequency band may correspond to a FR1 band (e.g., a sub-6 GHz frequency band) and the second frequency band may correspond to a FR2 band (e.g., a millimeter wave frequency band).

In some examples, the resource reservation message may be received as a groupcast message transmitted to the target sidelink device for the user data traffic and other neighboring sidelink devices. In some examples, the resource reservation message may be received via an omni-directional beam. For example, the communication and processing circuitry 1041, together with the transceiver 1010, shown and described above in connection with FIG. 10 may receive the resource reservation message on the first frequency band from the second sidelink device.

At block 1204, the first sidelink device may manage interference on the reserved resources based on the resource reservation message. For example, the first sidelink device may avoid utilization of the reserved resources for sidelink communication. As an example, the first sidelink device may avoid scheduling another PSCCH/PSSCH on the same FR2 resources indicated in the resource reservation message. For example, the resource assignment and scheduling circuitry 1043, shown and described above in connection with FIG. 10, may manage interference on the reserved resources for the additional sidelink communication.

Figure 13:
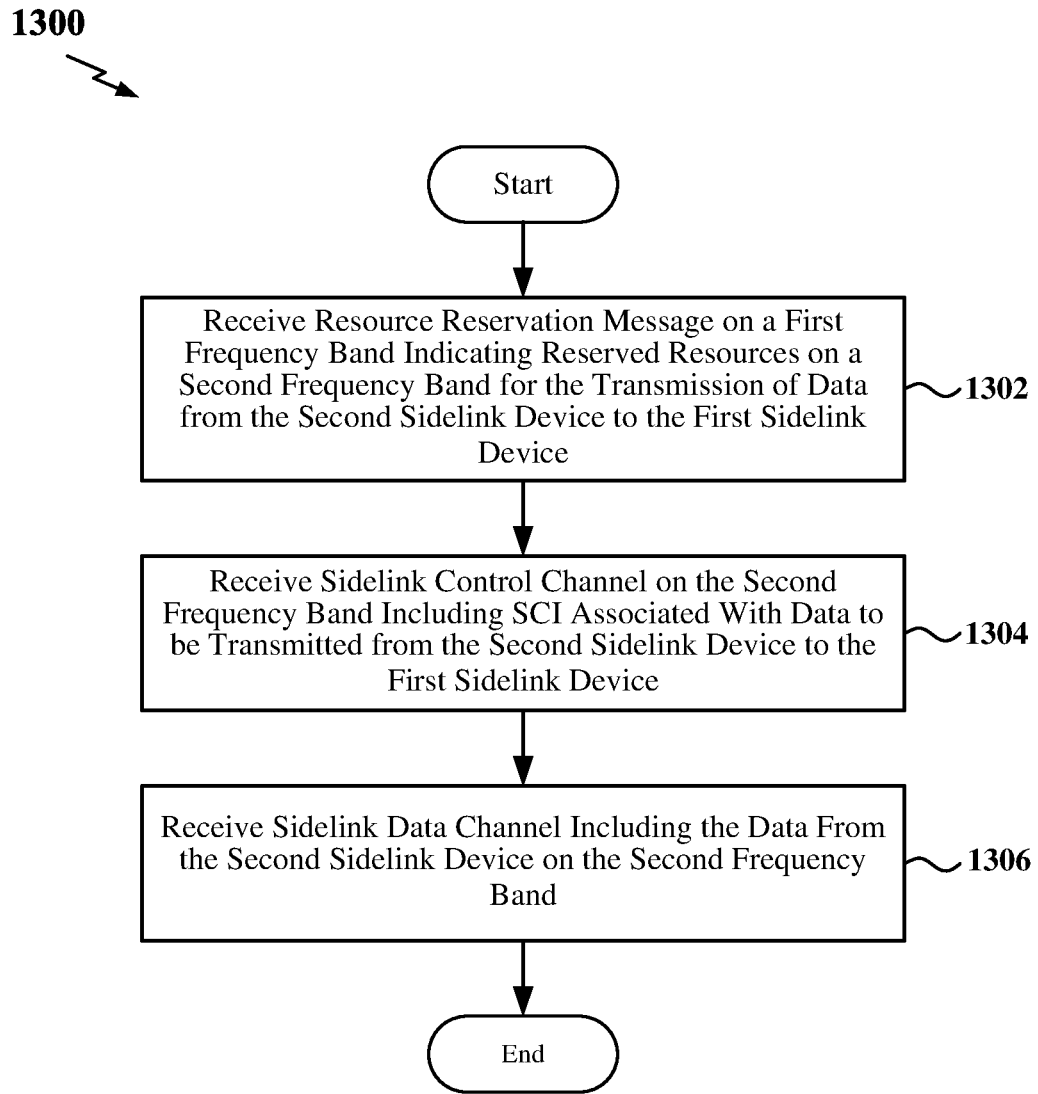
FIG. 13 is a flow chart of another exemplary method for wireless communication at a receiving sidelink device.

FIG. 13 is a flow chart 1300 of another exemplary method for wireless communication at a receiving sidelink device. As described below, some or all illustrated features may be omitted in a particular implementation within the scope of the present disclosure, and some illustrated features may not be required for implementation. In some examples, the method may be performed by the sidelink device 1000, as described above and illustrated in FIG. 10, by a processor or processing system, or by any suitable means for carrying out the described functions.

At block 1302, a first sidelink device (e.g., a receiving sidelink device) may receive a resource reservation message on a first frequency band including a first carrier frequency from a second sidelink device (e.g., a transmitting sidelink device). The resource reservation message may include an indication of reserved resources on a second frequency band for the transmission of user data traffic (e.g., V2X data or other sidelink data) from the second sidelink device to the first sidelink device. In some examples, the first frequency band may correspond to a FR1 band (e.g., a sub-6 GHz frequency band) and the second frequency band may correspond to a FR2 band (e.g., a millimeter wave frequency band). In other examples, the first frequency band may correspond to a FR2 band, while the second frequency band may correspond to a FR1 band.

In some examples, the resource reservation message may be received as a unicast message transmitted to the first sidelink device. In other examples, the resource reservation message may be received as a groupcast message or broadcast message transmitted to the first sidelink device and other neighboring sidelink devices. In some examples, the resource reservation message may be received via an omni-directional beam. In other examples, the resource reservation message may be received via a directional beam (e.g., BPL).

In some examples, the resource reservation message may function as a paging message to activate a second sidelink established on the second frequency band with the second sidelink device and to wake-up the first sidelink device. In this example, the first sidelink device may establish a first sidelink between the first sidelink device and the second sidelink device over the first frequency band. The first sidelink device may further establish the second sidelink at least in part utilizing the first sidelink. For example, the second sidelink may be established utilizing the first sidelink based on, for example, a V2X NSA deployment.

In some examples, the resource reservation message may function as an SPS activation or deactivation message. For example, the resource reservation message may be an SPS message activating or deactivating a semi-persistently configured assignment of periodic resources including the reserved resources. For example, the communication and processing circuitry 1041, together with the transceiver 1010, shown and described above in connection with FIG. 10 may receive the resource reservation message on the first frequency band from the second sidelink device.

At block 1304, the first sidelink device may receive a sidelink control channel (e.g., a PSCCH) on the second frequency band including SCI associated with the user data traffic to be transmitted from the second sidelink device to the first sidelink device. The SCI may include scheduling information indicating scheduled resources within the reserved resources within which the user data traffic will be transmitted. In some examples, the reserved resources may include a time resource window indicating a starting time and duration of time and a set of frequency resources indicating a starting resource block and a number of resource blocks. In this example, the PSCCH may be received during the time resource window and within the set of frequency resources. In some examples, the first sidelink device may beamform towards the second sidelink device during the time resource window to receive the PSCCH using at least one directional beam. For example, the communication and processing circuitry 1041, beam management circuitry 1044, and transceiver 1010, shown and described above in connection with FIG. 10 may receive the PSCCH on the second frequency band from the second sidelink device.

At block 1306, the first sidelink device may receive a sidelink data channel (e.g., a PSSCH) including the user data traffic from the second sidelink device on the second frequency band. In some examples, the PSSCH may be received during the time resource window and within the set of frequency resources. In some examples, the first sidelink device may beamform towards the second sidelink device during the time resource window to receive the PSSCH using at least one directional beam. For example, the communication and processing circuitry 1041, beam management circuitry 1044, and transceiver 1010 shown and described above in connection with FIG. 10 may receive the PSSCH on the second frequency band from the second sidelink device.

In one configuration, the sidelink device 1000 includes means for performing the various functions and processes described in relation to FIGS. 11-13. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1,2, and/or 4-7, and utilizing, for example, the processes and/or algorithms described herein in relation to FIGS. 11-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-7, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first sidelink device, the method comprising:
   transmitting a resource reservation message on a first frequency band comprising a first carrier frequency, the resource reservation message comprising an indication of reserved resources on a second frequency band comprising a second carrier frequency for transmission of user data traffic from the first sidelink device to a second sidelink device;
   transmitting a sidelink control channel on the second frequency band within the reserved resources, the sidelink control channel comprising sidelink control information (SCI) associated with the user data traffic to be transmitted from the first sidelink device to the second sidelink device; and
   transmitting a sidelink data channel comprising the user data traffic on the second frequency band within the reserved resources.

2. The method of claim 1, wherein the transmitting the resource reservation message on the first frequency band further comprises:
   transmitting a unicast radio resource control (RRC) resource reservation message to the second sidelink device on the first frequency band; and
   transmitting a groupcast resource reservation message to a set of one or more additional sidelink devices on the first frequency band.

3. The method of claim 1, wherein the transmitting the resource reservation message on the first frequency band further comprises:
   transmitting a groupcast resource reservation message to the second sidelink device and to a set of one or more additional sidelink devices on the first frequency band to enable the set of one or more additional sidelink devices to manage interference on the reserved resources for additional sidelink communication.

4. The method of claim 1, wherein the reserved resources comprise a time resource window and a set of frequency resources, wherein the time resource window comprises a starting time and a duration of time and the set of frequency resources comprises a starting resource block and a number of resource blocks within the second frequency band.

5. The method of claim 4, wherein the SCI comprises scheduling information, the scheduling information comprising scheduled resources within the reserved resources for transmitting the user data traffic.

6. The method of claim 1, further comprising:
   receiving a sidelink feedback channel from the second sidelink device on the second frequency band, wherein the sidelink feedback channel comprises feedback information corresponding to the user data traffic.

7. The method of claim 1, further comprising:
   establishing a first sidelink with the second sidelink device on the first frequency band; and
   establishing, at least in part utilizing the first sidelink, a second sidelink with the second sidelink device on the second frequency band.

8. The method of claim 7, further comprising:
   activating the second sidelink to wake-up the second sidelink device utilizing the resource reservation message.

9. The method of claim 1, wherein the resource reservation message comprises a semi-persistent scheduling (SPS) message to activate or deactivate a semi-persistently configured assignment of periodic resources comprising the reserved resources for transmission of periodic user data traffic from the first sidelink device.

10. The method of claim 9, further comprising:
    triggering transmission of the SPS message based on a vehicle-to-everything (V2X) application associated with the first sidelink device and the second sidelink device or in response to an occurrence of a V2X event.

11. The method of claim 1, further comprising:
    communicating with the second sidelink device on the first frequency band utilizing an omni-directional beam, wherein the first frequency band comprises a sub-6 gigahertz frequency band; and
    communicating with the second sidelink device on the second frequency band utilizing at least one directional beam, wherein the second frequency band comprises a millimeter wave frequency band.

12. The method of claim 1, further comprising:
    communicating with the second sidelink device on the first frequency band utilizing at least one directional beam, wherein the first frequency band comprises a millimeter wave frequency band; and
    communicating with the second sidelink device on the second frequency band utilizing an omni-directional beam, wherein the second frequency band comprises a sub-6 gigahertz frequency band.

13. A first sidelink device, comprising:
    a processor;
    a wireless transceiver communicatively coupled to the processor; and
    a memory communicatively coupled to the processor, wherein the processor is configured to:
        transmit a resource reservation message on a first frequency band comprising a first carrier frequency via the wireless transceiver, the resource reservation message comprising an indication of reserved resources on a second frequency band comprising a second carrier frequency for transmission of user data traffic from the first sidelink device to a second sidelink device;

transmit a sidelink control channel on the second frequency band within the reserved resources via the wireless transceiver, the sidelink control channel comprising sidelink control information (SCI) associated with the user data traffic to be transmitted from the first sidelink device to the second sidelink device; and transmit a sidelink data channel comprising the user data traffic on the second frequency band within the reserved resources via the wireless transceiver.

14. The first sidelink device of claim 13, wherein the processor is further configured to:
   transmit a unicast radio resource control (RRC) resource reservation message to the second sidelink device on the first frequency band; and
   transmit a groupcast resource reservation message to a set of one or more additional sidelink devices on the first frequency band.

15. The first sidelink device of claim 13, wherein the processor is further configured to:
   transmit a groupcast resource reservation message to the second sidelink device and to a set of one or more additional sidelink devices on the first frequency band to enable the set of one or more additional sidelink devices to manage interference on the reserved resources for additional sidelink communication.

16. The first sidelink device of claim 13, wherein the processor is further configured to:
   establish a first sidelink with the second sidelink device on the first frequency band; and
   establish, at least in part utilizing the first sidelink, a second sidelink with the second sidelink device on the second frequency band; and
   activate the second sidelink to wake-up the second sidelink device utilizing the resource reservation message.

17. The first sidelink device of claim 13, wherein the resource reservation message comprises a semi-persistent scheduling (SPS) message to activate or deactivate a semi-persistently configured assignment of periodic resources comprising the reserved resources for transmission of periodic user data traffic from the first sidelink device.

18. A method for wireless communication at a first sidelink device, the method comprising:
   receiving a resource reservation message on a first frequency band comprising a first carrier frequency, the resource reservation message comprising an indication of reserved resources on a second frequency band comprising a second carrier frequency for transmission of user data traffic from a second sidelink device;
   receiving a sidelink control channel on the second frequency band, the sidelink control channel comprising sidelink control information (SCI) associated with the user data traffic to be transmitted from the second sidelink device to the first sidelink device; and
   receiving a sidelink data channel comprising the user data traffic on the second frequency band.

19. The method of claim 18, wherein the receiving the resource reservation message on the first frequency band further comprises:
   receiving a radio resource control (RRC) message comprising the resource reservation message from the second sidelink device on the first frequency band.

20. The method of claim 18, wherein the receiving the resource reservation message on the first frequency band further comprises:
   receiving a groupcast message comprising the resource reservation message from the second sidelink device on the first frequency band, wherein the groupcast message is further transmitted to a set of one or more additional sidelink devices on the first frequency band.

21. The method of claim 18, wherein the reserved resources comprise a time resource window and a set of frequency resources, wherein the time resource window comprises a starting time and a duration of time and the set of frequency resources comprises a starting resource block and a number of resource blocks.

22. The method of claim 21, wherein the SCI comprises scheduling information, the scheduling information comprising scheduled resources within the reserved resources on which the user data traffic will be transmitted.

23. The method of claim 21, further comprising:
   beamforming towards the second sidelink device during the time resource window to receive the sidelink control channel and the sidelink data channel using at least one directional beam, wherein the second frequency band comprises a millimeter wave frequency band and the first frequency band comprises a sub-6 gigahertz frequency band.

24. The method of claim 18, further comprising:
   transmitting a sidelink feedback channel to the second sidelink device on the second frequency band, wherein the sidelink feedback channel comprises feedback information corresponding to the user data traffic.

25. The method of claim 18, further comprising:
   establishing a first sidelink with a second sidelink device on the first frequency band; and
   establishing, at least in part utilizing the first sidelink, a second sidelink with the second sidelink device on the second frequency band.

26. The method of claim 25, further comprising:
   waking-up and activating the second sidelink in response to receiving the resource reservation message.

27. The method of claim 18, wherein the resource reservation message comprises a semi-persistent scheduling (SPS) message activating or deactivating a semi-persistently configured assignment of periodic resources comprising the reserved resources.

28. A method for wireless communication at a first sidelink device, the method comprising:
   receiving a resource reservation message on a first frequency band comprising a first carrier frequency, the resource reservation message comprising an indication of reserved resources on a second frequency band comprising a second carrier frequency for transmission of user data traffic from a second sidelink device to a third sidelink device, and
   managing interference on the reserved resources based on the resource reservation message.

29. The method of claim 28, wherein the managing interference on the reserved resources further comprises:
   avoiding utilization of the reserved resources for sidelink communication.

30. The method of claim 28, wherein the receiving the resource reservation message on the first frequency band further comprises:
   receiving a groupcast message comprising the resource reservation message from the second sidelink device on the first frequency band.

31. A first sidelink device, comprising:
   means for transmitting a resource reservation message on a first frequency band comprising a first carrier frequency, the resource reservation message comprising an indication of reserved resources on a second frequency band comprising a second carrier frequency for transmission of user data traffic from the first sidelink device to a second sidelink device;

means for transmitting a sidelink control channel on the second frequency band within the reserved resources, the sidelink control channel comprising sidelink control information (SCI) associated with the user data traffic to be transmitted from the first sidelink device to the second sidelink device; and means for transmitting a sidelink data channel comprising the user data traffic on the second frequency band within the reserved resources.

32. The first sidelink device of claim 31, wherein the means for transmitting the resource reservation message on the first frequency band further comprises:

means for transmitting a unicast radio resource control (RRC) resource reservation message to the second sidelink device on the first frequency band; and means for transmitting a groupcast resource reservation message to a set of one or more additional sidelink devices on the first frequency band.

33. The first sidelink device of claim 31, wherein the means for transmitting the resource reservation message on the first frequency band further comprises:

means for transmitting a groupcast resource reservation message to the second sidelink device and to a set of one or more additional sidelink devices on the first frequency band to enable the set of one or more additional sidelink devices to manage interference on the reserved resources for additional sidelink communication.

34. The first sidelink device of claim 31, further comprising:

means for receiving a sidelink feedback channel from the second sidelink device on the second frequency band, wherein the sidelink feedback channel comprises feedback information corresponding to the user data traffic.

35. The first sidelink device of claim 31, further comprising:

means for communicating with the second sidelink device on the first frequency band utilizing an omni-directional beam, wherein the first frequency band comprises a sub-6 gigahertz frequency band; and means for communicating with the second sidelink device on the second frequency band utilizing at least one directional beam, wherein the second frequency band comprises a millimeter wave frequency band.

36. The first sidelink device of claim 31, further comprising:

means for communicating with the second sidelink device on the first frequency band utilizing at least one directional beam, wherein the first frequency band comprises a millimeter wave frequency band; and means for communicating with the second sidelink device on the second frequency band utilizing an omni-directional beam, wherein the second frequency band comprises a sub-6 gigahertz frequency band.

37. A non-transitory computer-readable medium having stored therein instructions executable by one or more processors of a first sidelink device to:

transmit a resource reservation message on a first frequency band comprising a first carrier frequency, the resource reservation message comprising an indication of reserved resources on a second frequency band comprising a second carrier frequency for transmission of user data traffic from the first sidelink device to a second sidelink device;

transmit a sidelink control channel on the second frequency band within the reserved resources, the sidelink control channel comprising sidelink control information (SCI) associated with the user data traffic to be transmitted from the first sidelink device to the second sidelink device; and transmit a sidelink data channel comprising the user data traffic on the second frequency band within the reserved resources.

38. The non-transitory computer-readable medium of claim 37, further comprising instructions executable by the one or more processors of the first sidelink device to:

transmit a unicast radio resource control (RRC) resource reservation message to the second sidelink device on the first frequency band; and transmit a groupcast resource reservation message to a set of one or more additional sidelink devices on the first frequency band.

39. The non-transitory computer-readable medium of claim 37, further comprising instructions executable by the one or more processors of the first sidelink device to:

transmit a groupcast resource reservation message to the second sidelink device and to a set of one or more additional sidelink devices on the first frequency band to enable the set of one or more additional sidelink devices to manage interference on the reserved resources for additional sidelink communication.

40. The non-transitory computer-readable medium of claim 37, further comprising instructions executable by the one or more processors of the first sidelink device to:

receive a sidelink feedback channel from the second sidelink device on the second frequency band, wherein the sidelink feedback channel comprises feedback information corresponding to the user data traffic.

41. The non-transitory computer-readable medium of claim 37, further comprising instructions executable by the one or more processors of the first sidelink device to:

communicate with the second sidelink device on the first frequency band utilizing an omni-directional beam, wherein the first frequency band comprises a sub-6 gigahertz frequency band; and communicate with the second sidelink device on the second frequency band utilizing at least one directional beam, wherein the second frequency band comprises a millimeter wave frequency band.

42. The non-transitory computer-readable medium of claim 37, further comprising instructions executable by the one or more processors of the first sidelink device to:

communicate with the second sidelink device on the first frequency band utilizing at least one directional beam, wherein the first frequency band comprises a millimeter wave frequency band; and communicate with the second sidelink device on the second frequency band utilizing an omni-directional beam, wherein the second frequency band comprises a sub-6 gigahertz frequency band.

43. A first sidelink device, comprising:

a processor; and a memory coupled to the processor, the processor being configured to:

receive a resource reservation message on a first frequency band comprising a first carrier frequency, the resource reservation message comprising an indication of reserved resources on a second frequency band comprising a second carrier frequency for transmission of user data traffic from a second sidelink device;

receive a sidelink control channel on the second frequency band, the sidelink control channel comprising sidelink control information (SCI) associated with the user data traffic to be transmitted from the second sidelink device to the first sidelink device; and receive a sidelink data channel comprising the user data traffic on the second frequency band.

44. The first sidelink device of claim 43, further comprising:
a transceiver coupled to the processor, wherein the processor is further configured to:
receive a radio resource control (RRC) message comprising the resource reservation message from the second sidelink device on the first frequency band via the transceiver.

45. The first sidelink device of claim 43, wherein the processor is further configured to:
receive a groupcast message comprising the resource reservation message from the second sidelink device on the first frequency band, wherein the groupcast message is further transmitted to a set of one or more additional sidelink devices on the first frequency band.

46. The first sidelink device of claim 43, wherein the reserved resources comprise a time resource window and a set of frequency resources, wherein the time resource window comprises a starting time and a duration of time and the set of frequency resources comprises a starting resource block and a number of resource blocks, and wherein the processor is further configured to:
beamform towards the second sidelink device during the time resource window to receive the sidelink control channel and the sidelink data channel using at least one directional beam, wherein the second frequency band comprises a millimeter wave frequency band and the first frequency band comprises a sub-6 gigahertz frequency band.

47. The first sidelink device of claim 43, wherein the processor is further configured to:
transmit a sidelink feedback channel to the second sidelink device on the second frequency band, wherein the sidelink feedback channel comprises feedback information corresponding to the user data traffic.

48. A first sidelink device, comprising:
means for receiving a resource reservation message on a first frequency band comprising a first carrier frequency, the resource reservation message comprising an indication of reserved resources on a second frequency band comprising a second carrier frequency for transmission of user data traffic from a second sidelink device;
means for receiving a sidelink control channel on the second frequency band, the sidelink control channel comprising sidelink control information (SCI) associated with the user data traffic to be transmitted from the second sidelink device to the first sidelink device; and
means for receiving a sidelink data channel comprising the user data traffic on the second frequency band.

49. The first sidelink device of claim 48, further comprising:
means for receiving a radio resource control (RRC) message comprising the resource reservation message from the second sidelink device on the first frequency band.

50. The first sidelink device of claim 48, further comprising:
means for receiving a groupcast message comprising the resource reservation message from the second sidelink device on the first frequency band, wherein the groupcast message is further transmitted to a set of one or more additional sidelink devices on the first frequency band.

51. The first sidelink device of claim 48, wherein the reserved resources comprise a time resource window and a set of frequency resources, wherein the time resource window comprises a starting time and a duration of time and the set of frequency resources comprises a starting resource block and a number of resource blocks, and wherein the first sidelink device further comprises:
means for beamforming towards the second sidelink device during the time resource window to receive the sidelink control channel and the sidelink data channel using at least one directional beam, wherein the second frequency band comprises a millimeter wave frequency band and the first frequency band comprises a sub-6 gigahertz frequency band.

52. The first sidelink device of claim 48, further comprising:
means for transmitting a sidelink feedback channel to the second sidelink device on the second frequency band, wherein the sidelink feedback channel comprises feedback information corresponding to the user data traffic.

53. A non-transitory computer-readable medium having stored therein instructions executable by one or more processors of a first sidelink device to:
receive a resource reservation message on a first frequency band comprising a first carrier frequency, the resource reservation message comprising an indication of reserved resources on a second frequency band comprising a second carrier frequency for transmission of user data traffic from a second sidelink device;
receive a sidelink control channel on the second frequency band, the sidelink control channel comprising sidelink control information (SCI) associated with the user data traffic to be transmitted from the second sidelink device to the first sidelink device; and
receive a sidelink data channel comprising the user data traffic on the second frequency band.

54. The non-transitory computer-readable medium of claim 53, further comprising instructions executable by the one or more processors of the first sidelink device to:
receive a radio resource control (RRC) message comprising the resource reservation message from the second sidelink device on the first frequency band.

55. The non-transitory computer-readable medium of claim 53, further comprising instructions executable by the one or more processors of the first sidelink device to:
receive a groupcast message comprising the resource reservation message from the second sidelink device on the first frequency band, wherein the groupcast message is further transmitted to a set of one or more additional sidelink devices on the first frequency band.

56. The non-transitory computer-readable medium of claim 53, wherein the reserved resources comprise a time resource window and a set of frequency resources, wherein the time resource window comprises a starting time and a duration of time and the set of frequency resources comprises a starting resource block and a number of resource blocks, and further comprising instructions executable by the one or more processors of the first sidelink device to:
beamform towards the second sidelink device during the time resource window to receive the sidelink control channel and the sidelink data channel using at least one directional beam, wherein the second frequency band comprises a millimeter wave frequency band and the first frequency band comprises a sub-6 gigahertz frequency band.

57. The non-transitory computer-readable medium of claim 53, further comprising instructions executable by the one or more processors of the first sidelink device to:
transmit a sidelink feedback channel to the second sidelink device on the second frequency band, wherein the sidelink feedback channel comprises feedback information corresponding to the user data traffic.

58. A first sidelink device, comprising:
a processor; and
a memory coupled to the processor, the processor being configured to:
receive a resource reservation message on a first frequency band comprising a first carrier frequency, the resource reservation message comprising an indication of reserved resources on a second frequency band comprising a second carrier frequency for transmission of user data traffic from a second sidelink device to a third sidelink device, and
manage interference on the reserved resources based on the resource reservation message.

59. The first sidelink device of claim 58, wherein the processor is further configured to:
avoid utilization of the reserved resources for sidelink communication.

60. The first sidelink device of claim 58, further comprising:
a transceiver coupled to the processor, wherein the processor is further configured to:
receive a groupcast message comprising the resource reservation message from the second sidelink device on the first frequency band via the transceiver.

61. A first sidelink device, comprising:
means for receiving a resource reservation message on a first frequency band comprising a first carrier frequency, the resource reservation message comprising an indication of reserved resources on a second frequency band comprising a second carrier frequency for transmission of user data traffic from a second sidelink device to a third sidelink device, and
means for managing interference on the reserved resources based on the resource reservation message.

62. The first sidelink device of claim 61, further comprising:
means for avoiding utilization of the reserved resources for sidelink communication.

63. The first sidelink device of claim 61, further comprising:
means for receiving a groupcast message comprising the resource reservation message from the second sidelink device on the first frequency band.

64. A non-transitory computer-readable medium having stored therein instructions executable by one or more processors of a first sidelink device to:
receive a resource reservation message on a first frequency band comprising a first carrier frequency, the resource reservation message comprising an indication of reserved resources on a second frequency band comprising a second carrier frequency for transmission of user data traffic from a second sidelink device to a third sidelink device, and
manage interference on the reserved resources based on the resource reservation message.

65. The non-transitory computer-readable medium of claim 64, further comprising instructions executable by the one or more processors of the first sidelink device to:
avoid utilization of the reserved resources for sidelink communication.

66. The non-transitory computer-readable medium of claim 64, further comprising instructions executable by the one or more processors of the first sidelink device to:
receive a groupcast message comprising the resource reservation message from the second sidelink device on the first frequency band.

* * * * *